(12) United States Patent
Ji

(10) Patent No.: US 11,590,695 B2
(45) Date of Patent: Feb. 28, 2023

(54) PHOTOCURING PRINTING SYSTEM AND METHOD

(71) Applicant: YUANZHI TECHNOLOGY (SHANGHAI) CO., LTD., Shanghai (CN)

(72) Inventor: Pengkai Ji, Shanghai (CN)

(73) Assignee: YUANZHI TECHNOLOGY (SHANGHAI) CO., LTD., Shanghai (CN)

( * ) Notice: Subject to any disclaimer, the term of this patent is extended or adjusted under 35 U.S.C. 154(b) by 33 days.

(21) Appl. No.: 17/133,715

(22) Filed: Dec. 24, 2020

(65) Prior Publication Data

US 2021/0187829 A1    Jun. 24, 2021

(51) Int. Cl.
| | |
|---|---|
| B29C 64/00 | (2017.01) |
| B33Y 30/00 | (2015.01) |
| B33Y 10/00 | (2015.01) |
| G03G 15/00 | (2006.01) |
| B29C 64/147 | (2017.01) |
| G03G 15/22 | (2006.01) |
| B29C 64/205 | (2017.01) |
| B29C 64/245 | (2017.01) |

(52) U.S. Cl.
CPC .......... *B29C 64/147* (2017.08); *B29C 64/205* (2017.08); *B29C 64/245* (2017.08); *B33Y 10/00* (2014.12); *B33Y 30/00* (2014.12); *G03G 15/224* (2013.01)

(58) Field of Classification Search
CPC ......... B29C 64/00; B29C 64/10; B29C 64/14; B29C 64/147; B29C 64/20; B29C 64/24; B29C 64/245; B29C 64/205; B33Y 10/00; B33Y 30/00; G03G 15/00; G03G 15/20; G03G 15/22; G03G 15/224
See application file for complete search history.

(56) References Cited

U.S. PATENT DOCUMENTS

| | | | | |
|---|---|---|---|---|
| 9,423,756 B2 * | 8/2016 | Hanson | ............. | G03G 15/1625 |
| 2019/0022937 A1 * | 1/2019 | Stelter | .................. | B29C 64/218 |

FOREIGN PATENT DOCUMENTS

CN    109605737 A    4/2019

\* cited by examiner

*Primary Examiner* — Jacob T Minskey
*Assistant Examiner* — Matthew Hoover

(57) ABSTRACT

A photocuring printing system. A developing drum is rotatable and is light-transmissive; the developing drum and a carrier are oppositely arranged and movable with respect to each other; the developing drum has a developing surface on which an electrostatic latent image is formed by the developing engine; a feeder and the developing surface are oppositely arranged; during a rotation of the developing drum, a photocurable material provided by the feeder is selectively attracted by the electrostatic latent image to form a material layer on the developing surface; the material layer is applied, by the developing drum, on a forming surface of the carrier or a cured model on the carrier; and a curing light beam emitted by a curing light source passes through a material-laying side of the developing drum to irradiate the material layer between the developing drum and the carrier to form a cured layer.

18 Claims, 13 Drawing Sheets

PHOTOCURING PRINTING SYSTEM AND METHOD

CROSS-REFERENCE TO RELATED APPLICATIONS

This application claims the benefit of priority from Chinese Patent Application No. 201911348676.9, filed on Dec. 24, 2019. The content of the aforementioned application, including any intervening amendments thereto, is incorporated herein by reference in its entirety.

TECHNICAL FIELD

The present application relates to the printing, and more particularly to a photocuring printing system and a photocuring printing method.

BACKGROUND

The existing UltraVoilet (UV) curing printing methods mainly use the curing light source such as laser, Digital Light Processing (DLP), Light Emitting Diode (LED) or Liquid Crystal Display (LCD) to selectively irradiate the photocurable resin to form a cured layer, and stack layers to form a three-dimensional model, such as stereo lithography apparatus (SLA) or DLP surface projection stereolithography printing method.

For the SLA type, a photocurable material may be the photocurable resin liquid material or the paste mixed with other powder materials, and generally first scraped flat, then irradiates selectively by the curing light beam to form the cured layer, and then repeats the above process to stack the cured layers until the 3D model printing is completed. In this way, it is not easy to print the three-dimensional model of composite materials, and it is not easy to print the color model. Moreover, because the laying and light curing are carried out in different time, the printing speed is affected. The thickness of the laying is easily affected by the gap between the scraper, the moving speed of the scraper, the temperature or vibration of the material carrier (printing platform), the viscosity and surface characteristics of the printing material, or the composition formula of the printing material, thus affecting the accuracy of the layer thickness and the accuracy of the three-dimensional model. For DLP printing mode, although it can improve the printing speed, it is still not easy to achieve composite or color printing, and it is not easy to achieve large model printing.

Electrostatic imaging technology of traditional two-dimensional printing technology is commonly used in 2D printing technology. The selective attraction of printing material is realized by the development drum through the charging process, exposure imaging process and development process. In the transfer process, the printing material is solidified on the paper by heating. Although it is easy to realize color printing, the heating process will affect the printing speed, and it is not suitable for printing of three-dimensional models. It is necessary to develop a fast and more suitable printing method or device for composite materials and color models.

SUMMARY

The technical problem to be solved by the invention is to provide a photocuring printing system and a method to realize simultaneous selectively photocurable material laying and photocuring, which is conducive to improving the printing speed and printing accuracy.

The technical solutions of the present application are described as follows.

A photocuring printing system, comprising a developing assembly, a carrier and a curing light source;

wherein the developing assembly comprises a developing drum, a developing engine and a feeder; the developing drum is rotatable around its central axis and is light-transmissive; the developing drum and the carrier are oppositely arranged and movable with respect to each other; the developing drum has a developing surface on which an electrostatic latent image is formed by the developing engine; the feeder and the developing surface of the developing drum are oppositely arranged; and during a rotation of the developing drum around its central axis, a photocurable material provided by the feeder is selectively attracted by the electrostatic latent image to form a material layer on the developing surface; the material layer is applied, by the developing drum, on a forming surface of the carrier or a cured model on the carrier; and a curing light beam emitted by the curing light source passes through a material-laying side of the developing drum to irradiate the material layer between the developing drum and the carrier to form a cured layer.

A photocuring printing system, comprising a developing assembly, a carrier, a curing light source and a conveying mechanism configured to convey the material layer;

wherein the conveying mechanism has a material layer attachment surface which is rotatable and light-transmissive; the conveying mechanism and the carrier are oppositely arranged and movable with respect to each other; the developing assembly comprises a developing drum, a developing engine and a feeder; the developing drum is rotatable around its central axis; the developing drum has a developing surface on which an electrostatic latent image is formed by the developing engine; the developing surface of the developing drum and the material layer attachment surface of the conveying mechanism are oppositely arranged; and during a rotation of the developing drum around its central axis, a photocurable material provided by the feeder is selectively attracted by the electrostatic latent image to form a material layer on the developing surface; the material layer between the developing surface of the developing drum and the material layer attachment surface of the conveying mechanism is attracted and attached to the material layer attachment surface of the conveying mechanism; the material layer is applied, by the conveying mechanism, on a forming surface of the carrier or a cured model on the carrier; and a curing light beam emitted by the curing light source passes through a material-laying side of the conveying mechanism to irradiate the material layer between the conveying mechanism and the carrier to form a cured layer.

In an embodiment, the developing drum comprises a photoconductive layer and an electroconductive layer bound together from outside to inside;

the developing engine comprises a first electrostatic generator and a developing light source; the first electrostatic generator is arranged upstream from the feeder along a rotational direction of the developing drum; the first electrostatic generator produces static electricity on the photoconductive layer; the developing light source is arranged between the first electrostatic generator and the feeder along a rotational direction of the developing drum; and a developing light beam emitted by the developing light source selectively irradiates the photoconductive layer to form the electrostatic latent image on the developing surface.

In an embodiment, the developing surface of the developing drum is electrically insulating; the developing engine comprises an ion-deposition device which is arranged upstream from the feeder along a rotational direction of the developing drum, the ion-deposition device selectively deposits ions or electrons to the developing surface of the developing drum to form the electrostatic latent image.

In an embodiment, the feeder comprises a wheel hub that is rotatable, a material box and a second electrostatic generator; the photocurable material that is liquid is accommodated in the material box; the wheel hub is partially immersed in the photocurable material; a surface of the wheel hub and the developing surface of the developing drum are oppositely arranged; when the wheel hub rotates, the photocurable material attached on the surface of the wheel hub becomes layered; the second electrostatic generator is arranged between the material box and the developing drum along a rotational direction of the wheel hub; and the second electrostatic generator produces static electricity on the photocurable material that is layered on the surface of the wheel hub.

In an embodiment, a first electrode is provided at an inner side of the wheel hub and configured to attract the photocurable material that is layered.

In an embodiment, the forming surface of the carrier is flat; and the carrier and the developing drum perform linear translation with respect to each other.

In an embodiment, the forming surface of the carrier is an annular or circular plane; the carrier and the developing drum are horizontally rotatable with respect to each other and around a central axis of the carrier; or the forming surface of the carrier is cylindrical; a relative rotation between the carrier and the developing drum is formed by respective rotations of the developing drum and the carrier; the developing drum is continuously rotatable in a predetermined direction; the carrier and the developing drum are continuously movable away from each other such that cured layers are stacked layer by layer in a spiral manner to form the cured model on the carrier.

In an embodiment, the carrier is circularly movable along a rectangular track and the developing drum is rotatable in a predetermined direction such that cured layers are stacked layer by layer to form the cured model on the carrier.

In an embodiment, the forming surface of the carrier is flat; and the carrier and the conveying mechanism perform linear translation with respect to each other.

In an embodiment, the forming surface of the carrier is an annular or circular plane; and the carrier and the conveying mechanism are horizontally rotatable with respect to each other and around a central axis of the carrier; or the forming surface of the carrier is cylindrical; a relative rotation between the carrier and the conveying mechanism is formed by respective rotations of the conveying mechanism and the carrier; the material layer attachment surface of the conveying mechanism is continuously rotatable in a predetermined direction; and the carrier and the conveying mechanism are continuously movable away from each other such that cured layers are stacked layer by layer in a spiral manner to form the cured model on the carrier.

In an embodiment, the carrier is circularly movable along a rectangular track and the conveying mechanism is rotatable in a predetermined direction such that the cured layers are stacked layer by layer to form the cured model on the carrier.

In an embodiment, the conveying mechanism comprises a conveyor belt that is circularly rotatable and a roller-shaped electrode configured to attract the material layer; and the roller-shaped electrode is opposite to the developing drum and arranged on an inner side of the conveyor belt.

In an embodiment, the conveying mechanism comprises a conveying drum that is rotatable, a conveying belt that is circularly rotatable, and a second electrode and a roller-shaped electrode which are configured to attract the material layer; the conveying drum is arranged between the developing drum and the conveying belt; a material layer attachment surface of the conveying drum matches with the developing surface of the developing drum and a material layer attachment surface of the conveying belt, respectively; the second electrode is arranged on an inner side of the conveying drum; the roller-shaped electrode is opposite to the conveying drum and arranged on an inner side of the conveying belt; and the material layer is laid on the surface of the carrier or the cured model on the carrier through the conveyor belt.

In an embodiment, the photocuring printing system comprises a plurality of developing assemblies; developing drums of the plurality of developing assemblies each are opposite to the material layer attachment surface of the conveying mechanism.

In an embodiment, the photocuring printing system comprises a plurality of developing assemblies; developing drums of the plurality of developing assemblies simultaneously apply material layers on the same layer or different layers followed by photocuring.

The present application provides a photocuring printing method using the photocuring printing system of claim 1, comprising:
1) driving the developing drum to rotate; selectively forming the electrostatic latent image on the developing surface of the developing drum by the developing engine; and selectively attracting, by the electrostatic latent image, the photocurable material provided by the feeder to form the material layer;
2) starting relative movement between the developing drum and the carrier; and applying, by the developing drum, the material layer on the forming surface of the carrier or the cured model on the carrier; and
3) while the material layer is applied on the forming surface of the carrier, emitting the curing light beam by the curing light source to pass through the material-laying side of the developing drum and irradiate the material layer between the developing drum and the carrier to form the cured layer bound to the carrier or the cured model on the carrier.

In an embodiment, the photocuring printing system comprises a plurality of developing assemblies which synchronously work; the material layer prepared from different materials or having different colors is applied by developing drums of the plurality of developing assemblies; and the curing light beam passes through the material-laying side of respective developing drums to irradiate the material layer to perform photocuring to obtain the cured layer prepared from different materials or having different colors, bound to the carrier or the cured model on the carrier.

In an embodiment, during printing, the developing drum is driven to rotate; the electrostatic latent image is selectively formed on the developing surface of the developing drum by the developing engine; and the electrostatic latent image selectively attracts the photocurable material provided by the feeder to form the material layer;

when the material layer attached on the developing drum rotates and arrives between the developing drum and the conveying mechanism, the material layer is transferred, by electric attraction, from the developing surface of the developing drum to the material layer attachment surface of the conveying mechanism;

the conveying mechanism and the carrier move respect to each other; the material layer is applied, by the conveying mechanism, on the forming surface of the carrier or the cured model on the carrier; and while the material layer is applied on the surface of the carrier, the curing light beam emitted by the curing light source passes through the material-laying side of the conveying mechanism to irradiate the material layer between the conveying mechanism and the carrier to form the cured layer bound to the carrier or the cured model on the carrier.

In an embodiment, the photocuring printing system comprises a plurality of developing assemblies which synchronously work; developing drums of the plurality of developing assemblies are respectively opposite to the material layer attachment surface of the conveying mechanism; the plurality of developing drums respectively and selectively attract photocurable materials that differ in material or color to form material layers prepared from different materials or having different colors; the formed material layers are then transferred to the material layer attachment surface of the conveying mechanism to form a combination layer of the material layers; and the combination layer is applied, by the conveying mechanism, to the forming surface of the carrier or the cured model on the carrier, and the curing light beam emitted by the curing light source passes through the material-laying side of the conveying mechanism to irradiate the combination layer between the conveying mechanism and the carrier to form the cured layer.

Compared to the prior art, the present application has the following beneficial effects.

1) In the present application, the photocuring printing is performed using the electrostatic/ion imaging technique and photocuring process. The material layer is cured while being directly bound to a flat carrier or being bound to a cured model on a carrier. In this way, it is easier for the material layer to be peeled off and detached from the developing drum and transferred to the carrier, in addition, both of the multilayer three-dimensional curing models and flat patterns can be printed. Significant increase in printing speed is realized by simultaneously performing photocuring and material laying. Furthermore, a plurality of developing assemblies simultaneously work to perform material laying and printing for the same layer or different layers, which helps to further increase the printing speed.

2) In the present application, a distance between the developing drum and the carrier or a distance between the conveying mechanism and the carrier that is related to a material layer thickness can be accurately controlled by setting a device or a control system, so as to accurately control the material layer thickness. The photocurable material layer is irradiated by the curing light beam and cured under the condition that the material layer thickness is controlled, and after the developing drum or the conveying mechanism is separated from the cured layer, there is no variation or a very small variation in the thickness of the cured layer, so that the printing of the three-dimensional model can become more accurate. In addition, the photocurable material is cured when being squeezed, which is also beneficial to improve the density and strength of the three-dimensional model to be printed.

3) In the present invention, a plurality of developing assemblies simultaneously apply different materials or materials having different colors along the same or different layers, which can realize the printing and forming of composite material models or color models. Or, the plurality of developing assemblies cooperate with the conveying mechanism to apply different materials or materials having different colors, so as to print and form the composite material models or color models.

4) Because the photocurable material on the material-laying side of the developing drum or the conveying mechanism is cured under light irradiation in a controlled state, the influence of external factors such as ambient temperature and vibration on the printing accuracy is greatly reduced, and thus, the system of the present application is suitable for the printing of devices such as ships, trains and airplanes.

5) During the printing process, the material layer is cured by the curing light beam of the curing light source to form a cured layer. At the same time, the developing drum or the conveying mechanism is separated from the cured layer by rotating and peeling, which can improve their separation efficiency and reduce the impact of their separation on the structure accuracy of the cured layer, and thus, the system of the present application is suitable for 3D printing and the printing of patterns or text on the paper or the fabric. In addition, heating is not required, so the control and printing process is simplified, and the printing material and the carrier can be rapidly combined, thereby improving the printing accuracy and speed and the operational reliability of the system.

DETAILED DESCRIPTION OF EMBODIMENTS

The present application will be further described below with reference to the embodiments. It should be understood that these embodiments are merely illustrative, but are not intended to limit the scope of the present application. In addition, any modifications or placements made by those skilled in the art based on the spirit of the present disclosure should fall within the scope as defined by the appended claims.

Figure 1:
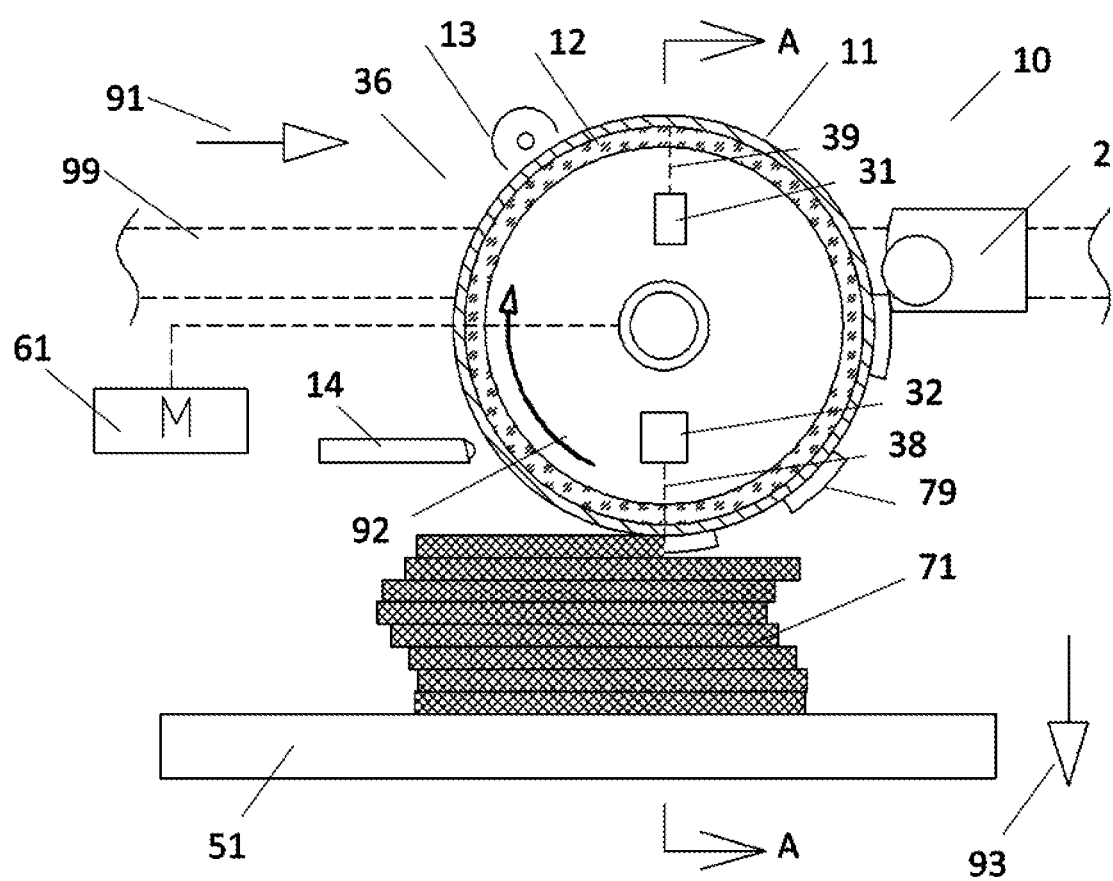
FIG. 1 is a schematic diagram of a photocuring printing system according to an embodiment of the present application.

Provided herein is a photocuring printing system, which includes a developing assembly 10, a carrier, a curing light source 32 and a driving device. The developing assembly 10 is configured to selectively apply a material layer 79 on the carrier. The developing assembly 10 includes a developing drum 36, a developing engine and a feeder 2. The developing engine is configured to form an electrostatic latent image on a developing surface of the developing drum 36; the electrostatic latent image (pattern) may be positively or negatively charged with a desired magnitude. The developing drum 36 is rotatable around its central axis (i.e., an axis 95), and for example, the developing drum 36 is rotatable along an arrow 92. A photocurable material 75 suitable for photocuring is accommodated in the feeder 2. The feeder 2 is configured to apply the material layer 79 on a developing surface of the developing drum 36, for example, the feeder 2 may include an enclosure for retaining the photocurable material 75; the feeder 2 may also include one or more devices for transferring the photocurable material 75 to the developing surface of the developing drum 36, such as a roller, a paddle wheel, a fur brush and/or a magnetic brush; the photocurable material 75 may be charged, such as by friction or by inducing, to become negative or positive and have a desired magnitude, The photocurable material 75 can also be photocurable by a curing light beam irradiation (i.e., electromagnetic radiation), for example, the photocurable material 75 may be a liquid or pasty mixture of particles and a photocurable resin (or polymerizable liquid), where these particles can be charged to be electrostatic, and the photocurable resin (or polymerizable liquid) can be cured by a curing light beam irradiation. The developing surface of the developing drum 36 refers to a surface of the developing drum 36 on which a latent image is formed to selectively attract the photocurable material 75 to form the material layer 79. The curing light source 32 emits a curing light beam 38 which passes through a material-laying side of the developing drum 36 and then irradiates the material layer 79 between the developing drum 36 and the carrier to cure the material layer 79. The material-laying side of the developing drum 36 refers to a side of the developing drum 36 that faces the carrier, for example, a bottom of the developing drum 36 shown in FIG. 1, at which the material layer may be peeled off from the developing drum 36 and applied on the carrier. The developing drum 36 is at least partially light-transmissive (i.e., optically transparent) at the relevant wavelength or optically transparent to the light beam emitted by the curing light source 32 or/and by an developing light source 31, for example, the developing drum 36 is made of a transparent material or only the material-laying side of the developing drum 36 allows the light beam to go through. The carrier shown in FIG. 1 is a platform 51. The driving device is configured to drive the developing assembly 10 and the carrier to move with respect to each other. The relative movement between the developing assembly 10 and the carrier includes relative vertical movement and relative horizontal movement. The relative vertical movement can be realized by adjusting a distance between the developing assembly 10 and the carrier during the printing process, for example, the distance is enlarged step by step or continuously.

Figure 2:
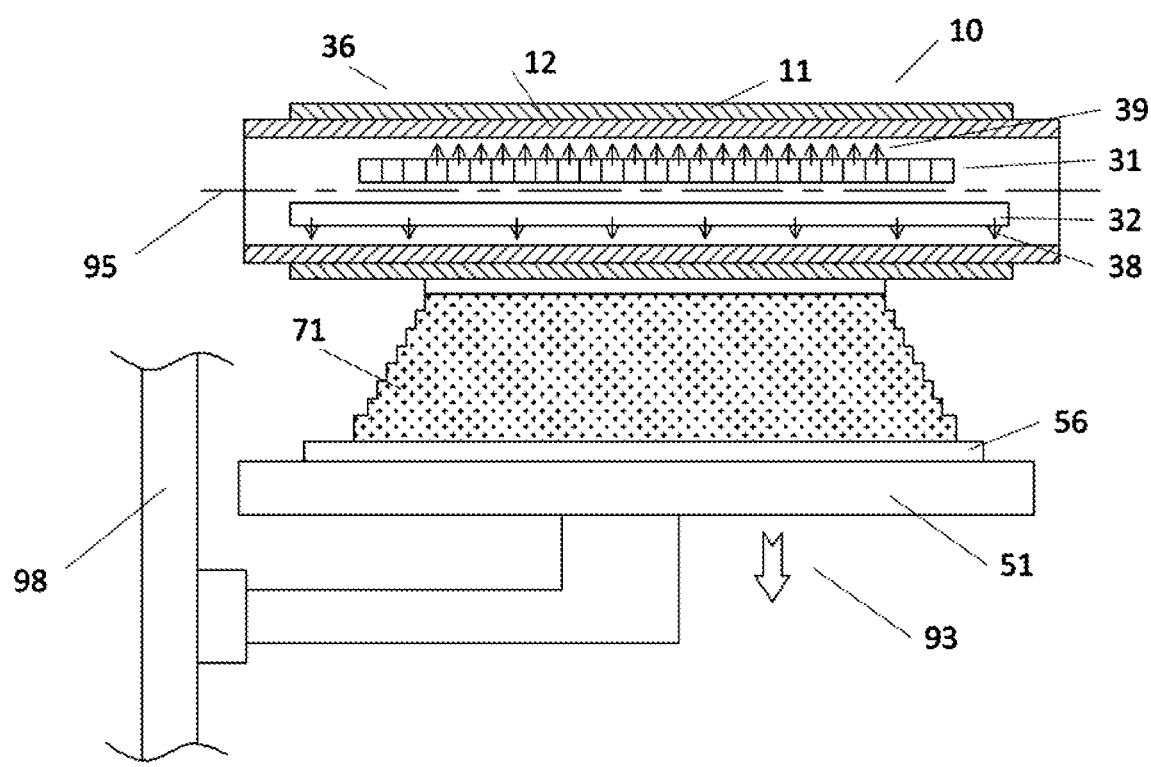
FIG. 2 is a section view of the photocuring printing system taken along A-A of FIG. 1.

The relative vertical movement (relative separation, or movement away from each other) between the developing assembly 10 and the carrier (such as the platform 51) can be realized by moving only the developing assembly 10, or moving only the carrier (such as the platform 51), or simultaneously moving both, for example, the platform 51 shown in FIG. 2 moves along a vertical guide rail 98 and in a direction of an arrow 93 to realize the relative vertical movement (relative separation), or the developing assembly 10 moves in an opposite direction of the arrow 93 to realize the relative vertical movement (relative separation/movement away from each other).

The relative horizontal movement between the developing assembly 10 and the carrier can be realized by moving the developing assembly 10 in a direction of an arrow 91 or moving the carrier in an opposite direction of the arrow 91, may move (or rotate) in a horizontal plane, for example, the developing assembly 10 shown in FIG. 1 moves along a horizontal guide rail 99 and in the direction of the arrow 91. In addition, the relative horizontal movement may be intended to express that the developing drum 36 or the conveying mechanism and the carrier are rotatable with respect to each other around the central axis of the carrier, or the developing drum 36 or the conveying mechanism and the carrier are rotatable with respect to each other by the manner that the developing drum 36 or the conveying mechanism and the carrier rotate respectively. The driving device may also include a driver 61 configured to drive the developing drum 36 to rotate. The carrier and the developing drum 36 may perform linear translation with respect to each other, which is realized by such as moving the developing drum 36 in a direction of an arrow 91 or moving the carrier in an opposite direction of the arrow 91, or/and optionally moving the carrier in a direction of an arrow 93 or moving the developing drum 36 in an opposite direction of the arrow 93. The carrier and the conveying mechanism may perform linear translation with respect to each other, which is realized by such as moving the conveying mechanism in a direction of an arrow 91 or moving the carrier in an opposite direction of the arrow 91, or/and optionally moving the carrier in a direction of an arrow 93 or moving the conveying mechanism in an opposite direction of the arrow 93.

Embodiment 1

Provided herein is a photocuring printing system based on a xerograph technique, as shown in FIGS. 1 and 2. A developing drum 36 that is light-transmissive (i.e., optically transparent) includes a photoconductive layer 11 and an electroconductive layer 12 bound together from outside to inside. The photoconductive layer 11 and the electroconductive layer 12 are light-transmissive, for example, being transparent. A developing engine and a feeder 2 are sequentially arranged along a rotational direction of the developing drum 36, and a photocurable material 75 is accommodated in the feeder 2. In the rotational direction of the developing drum 36, a material-laying side of the developing drum 36 (i.e., a side of the developing drum 36 where a process of applying a material layer 79 on a platform 51 is performed) is located downstream from the feeder 2.

The developing engine may include a first electrostatic generator 13 and a developing light source 31, as shown in FIG. 1. The first electrostatic generator 13 produces static electricity (i.e., induces electrostatic charge) on the developing surface of developing drum 36. The developing light source 31 is digitally-controlled, pixel-wise light exposure apparatus configured to selectively emit the electromagnetic radiation (a developing light beam 39) toward the uniform electrostatic charge on developing surface of developing drum as the developing surface rotates in the direction of arrow 92 past the developing light source 31. The developing light source 31 may be arranged inside the developing drum 36, as shown in FIG. 1, or may be arranged outside the developing drum 36. Under the condition that the developing light beam 39 irradiates outward from the inside of the developing drum, as shown in FIG. 1, the developing light source 31 is optionally arranged outside the developing drum 36, specifically, the developing light beam is directed into the developing drum by a lens system or other means and then irradiates outward. The position of the developing light source 31 is shown in the figures for the purpose of illustration.

The first electrostatic generator 13 is arranged upstream from the developing light source 31 to generate static electricity on a surface (i.e., the developing surface) of the photoconductive layer 11 of the developing drum 36. The developing light beam 39 emitted from the developing light source 31 selectively irradiates the photoconductive layer 11 according to a sliced layer pattern to be printed, and a region of the photoconductive layer 11 that is irradiated by the developing light beam 39 becomes conductive, which causes that discrete pixel-wise locations of the electrostatic charge of the photoconductive layer 11 is discharged by the electroconductive layer 12 or connected with an electrode of the corresponding electric potential, and the electric potential may be positive or negative, for example, discharged to ground. Other regions of the photoconductive layer 11 without beam irradiation remain insulated, and the static electricity (electrostatic charge) thereon keeps the same, thereby forming an electrostatic latent image charge pattern on the developing surface of developing drum 36.

With the rotation of the developing drum 36, the developing drum 36 selectively attracts the photocurable material 75 provided by the feeder 2 according to the electrostatic latent image, so that a visible developing pattern of the material layer 79 is formed on the developing surface of the developing drum 36. The developing drum 36 rotates while moving in a direction of an arrow 91 such that the material layer 79 is applied on a forming surface of the platform 51. In the present embodiment, the platform 51 used as a carrier has a flat forming surface. The forming surface refers to a surface of the carrier or the platform 51 on which the material layer is applied or refers to a surface of a cured model 71 on the carrier or on the platform 51 on which the material layer is applied. At the same time, a curing light beam 38 emitted by a curing light source 32 (that is, a light source for curing the material layer) passes through the electroconductive layer 12 and the photoconductive layer 11 and goes toward the platform 51 to irradiate the material layer 79, so the material layer 79 is cured and attached on the platform 51 or on a cured model 71 on the platform 51. The curing light source 32 (a light source for curing the material layer) may not be digitally pixel-wise controlled and may do not need pixel-wise light exposure to cure the material layer.

If a model to be printed is multi-layered, a distance between the developing drum 36 and the platform 51 can be adjusted. For example, the platform 51 shown in FIG. 1 or FIG. 2 moves a distance of a layer thickness along the arrow 91, so as to print the next layer, so the cured model 71 that is thicker or higher can be formed layer by layer. Preferably, the distance between the developing drum 36 and the platform 51 is reasonably controlled to allow material layer 79 between the developing drum 36 and the platform 51 in contact with the platform 51 or the cured model 71 on the platform 51, so that after being irradiated by the curing light beam 38, the material layer 79 is cured and directly bounded to the platform 51 or the cured model 71, and peeled off and separated from the developing surface of the developing drum 36. Preferably, the developing drum 36 is controlled to have desirable rotational speed and moving speed along the arrow 91 which match with each other, in this way, when being applied on the platform 51 or the cured model 71, the material layer 79 does not slide, wrinkle or deform, that is, the developing drum 36 and the platform 51 purely roll without slippage with respect to each other, which improves the forming accuracy. For the convenience of expression, a vertical guide rail 98 is not shown in FIG. 1, and a horizontal guide rail 99 is not shown in FIG. 2.

As shown in FIGS. 1 and 2, the developing light source 31 is arranged inside the developing drum 36, which facilitates other devices to be arranged outside the developing drum 36. The developing light source 31 may be an LED or LCD light source, as shown in FIG. 2. Of course, the developing light source 31 may also be a laser scanning light source, a DLP light source and the like. It should be noted that the curing light source 32 can be arranged inside the developing drum 36 and moves with the developing assembly 10, or the curing light source 32 is arranged outside the developing drum 36 and directed into the developing drum 36 by a lens system or other means, and then passes through the electroconductive layer 12 and the photoconductive layer 11 and irradiates toward the platform 51, that is, irradiates outward from the developing drum 36, in this case, the curing light source 32 may not move with the developing assembly. Similarly, the curing light source 32 may also be arranged outside a conveying mechanism that is configured to transfer the material layer. The figures show, for the purpose of illustration, that the developing light source 31 and the curing light source 32 are arranged inside the developing drum 36. Because the material layer 79 is formed by selective attraction according to a sliced layer pattern to be printed, the curing light source 32 does not need to perform selective irradiation and is only required to cure the material layer 79. The curing light source 32 may be arranged along a central axis 95 and continuously irradiate during the printing. The curing light source 32 can cure all material layers 79 that are transferred from the developing drum 36 onto the platform 51. With the rotation of the developing drum 36, curing light beams emitted by the curing light source 32 passes through the electroconductive layer 12 to irradiate all regions of the photoconductive layer 11, so as to cure the material layer 79, and make all the regions of the photoconductive layer 11 electroconductive and eliminate all static electricity (electrostatic charge) through the electroconductive layer 12, so new electrostatic latent images are ready to be regenerated subsequently. It should be noted that the process of applying the material layer 79 or the cured layers on the platform 51 refers to a process of directly applying the material layer 79 or the cured layers on the platform 51 or a process of applying the material layer 79 or the cured layers on the cured model 71 on the platform 51.

In addition, as shown in FIG. 1, the developing assembly may also include a cleaning device 14 which is close to the developing surface of the developing drum 36 and located between the material-laying side of the developing drum 36 and the developing engine along the rotational direction of the developing drum 36. The cleaning device 14 is used to remove the photocurable material that fails to be attached to the platform 51 and still remains on the developing surface of the developing drum 36. Furthermore, as shown in FIG. 2, a detachable plate 56 is detachably fixed on the platform 51. The cured model 71 is attached to the detachable plate 56 such that the cured model 71 can be rapidly removed from the platform 51 after printing.

Embodiment 2

Figure 3:
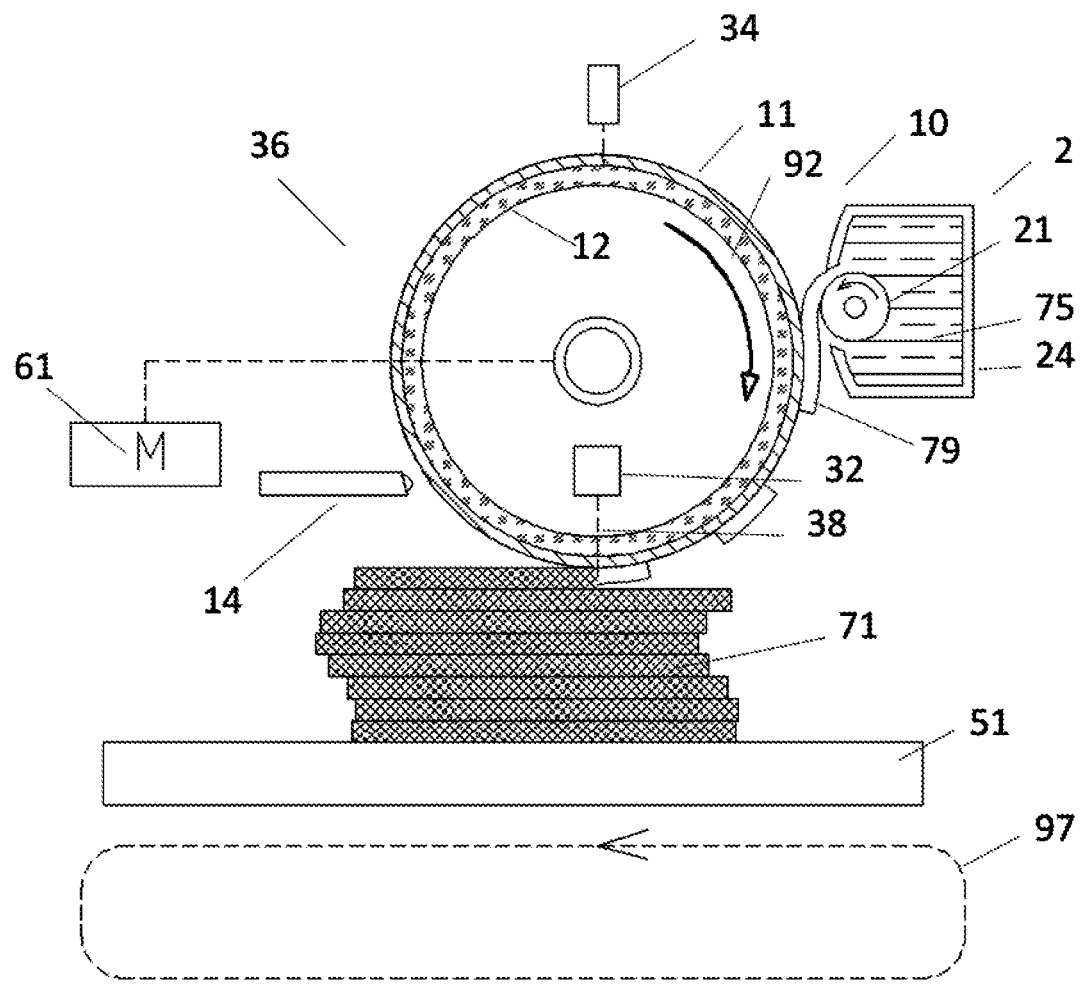
FIG. 3 is a schematic diagram of a photocuring printing system according to an embodiment of the present application.

Provided herein is a photocuring printing system based on ionography, as shown in FIG. 3. The present embodiment differs from the embodiment shown in FIGS. 1 and 2 in that the electrostatic latent image is formed on the developing surface of the development drum 36 in different ways. In the present embodiment, the first electrostatic generator 13 is canceled from the developing engine, instead, the developing engine includes an ion-deposition device 34, so when the developing drum 36 rotates, the ion-deposition device 34 selectively and directly deposits charged ions or electrons on the developing surface of the developing drum 36 according to a sliced layer pattern of the model to be printed to form electrostatic charge pattern, thereby forming the electrostatic latent image on the developing surface of the developing drum 36. Due to the use of iconography, the first electrostatic generator 13 can be removed, so the structure can be further simplified. The photoconductive layer 11 may also be replaced by other transparent and insulating material layers for cost saving.

In the embodiment shown in FIG. 1 or FIG. 3, a left side of the developing drum can also be provided with a second feeder (not shown in the figures). The second feeder may be located between the material-laying side and the developing engine in a direction of an arrow 92. As shown in FIG. 1, a right side of the developing drum 36 can also be provided with a second electrostatic generator (not shown in the figure). The second electrostatic generator may be located between the developing engine and the feeder in the direction of the arrow 92. When the developing drum 36 moves to a right end and the next layer needs to be printed, the platform 51 moves a distance of a layer thickness along an arrow 93. At the same time, the developing drum 36 moves to the left while rotating in an opposite direction of the arrow 92. At the same time, the second feeder works and the feeder on the right side of the developing drum stops working. In the embodiment as shown in FIG. 1, the second electrostatic generator works and the first electrostatic generator on the left side of the developing drum stops working. The material layer is formed on the left side of the developing drum and laid on the platform 51. After the material layer is cured, a cured layer is formed on the platform 51. The developing engine reciprocates, and when it arrives at a leftmost side, the platform 51 moves a distance of the layer thickness along the arrow 93, and then the developing drum starts to work in a manner as shown in the figures, so that cured layers are stacked layer by layer to form the cured model 71.

FIG. 3 also shows that the platform 51 is circularly movable along a rectangular track 97, that is, the platform 51 moves in a reciprocating manner. After each cycle, the platform 51 and the developing drum are separated by a set distance from each other, for example, the developing assembly moves upward by a distance of the layer thickness. In this way, the developing drum 36 can rotate in one direction during the whole printing process, and may does not need to move. In addition, there is no need to provide multiple feeders or electrostatic generators or developing light sources, which can greatly simplify the structure and control of the developing assembly 10.

In addition, FIG. 3 schematically shows a feeder 2 with a material box 24 and a wheel hub 21. The photocurable material 75 with static electricity is accommodated in the material box 24. With the rotation of the wheel hub 21, the photocurable material 75 is drawn out to form a thin layer which is then attracted to the developing drum 36 by the electrostatic latent image thereon to form the material layer 79.

Embodiment 3

Figure 4:
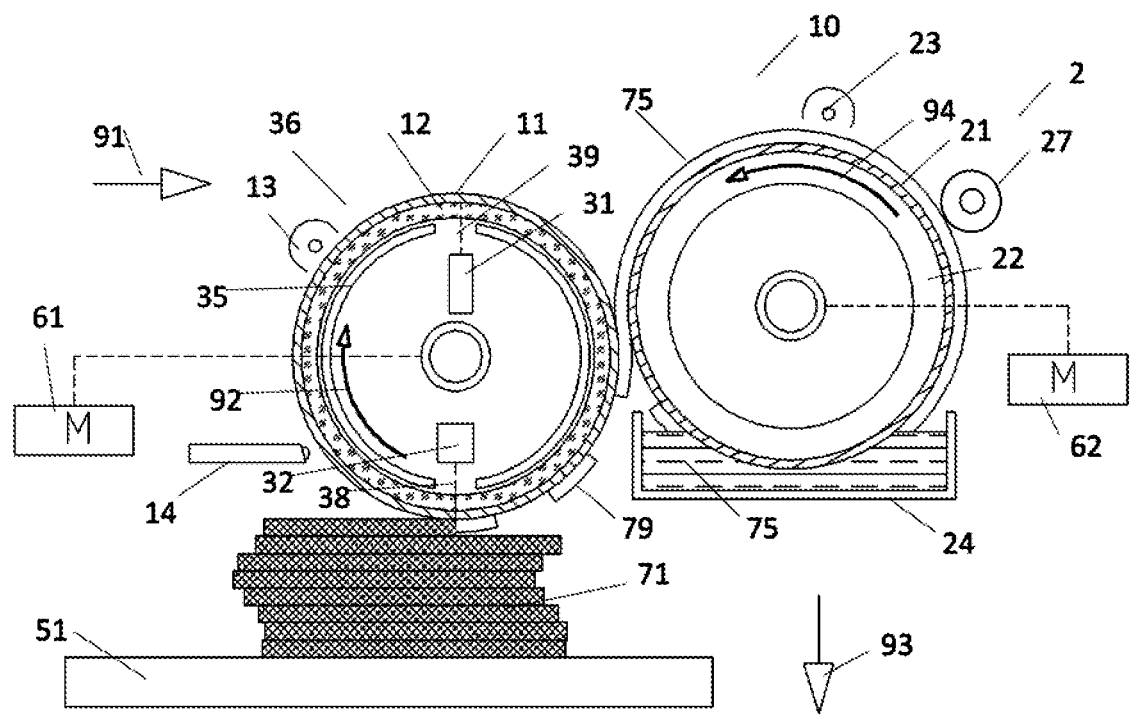
FIG. 4 is a schematic diagram of a photocuring printing system according to an embodiment of the present application.

FIG. 4 illustrates a feeder 2 with a wheel hub 21, a material box 24 and a second electrostatic generator 23. A photocurable material 75 is accommodated in the material box 24. The wheel hub 21 is partially immersed in the photocurable material 75 in the material box 24. The wheel hub 21 is driven by the driver 62 to rotate along an arrow 94. During the rotation of the wheel hub 21, the photocurable material 75 is attracted on a peripheral surface of the wheel hub 21 that may be above a liquid level of the photocuring printing material 75 in the form of a thin layer. The second electrostatic generator 23 can generate charges or static electricity uniformly distributed on the photocurable material 75 that is layered. For example, a corona tube can be used to ionize the air and move the ions to the photocurable material 75 that is layered under the drive of electric field, thereby forming uniformly distributed electric charges. The polarity of this static electricity can be opposite to that of the electrostatic latent image, so that the electrostatic latent image and the photocurable material 75 that is layered attract each other.

The wheel hub 21 and the developing drum 36 synchronously match with each other, specifically, their rotational directions are opposite, and their rotational speeds are adjusted to become appropriate, such that the wheel hub 21 and the developing drum 36 purely roll with respect to each other. A distance between the wheel hub 21 and the developing drum 36 is preciously controlled, so the photocurable material 75 that is layered can be selectively jumped from the wheel hub 21 to the developing drum 36 under the attraction of the electrostatic latent image on the developing drum 36 to form the material layer 79. The wheel hub 21 may also be provided with a first electrode 22 that may be ring-shaped, the polarity of which may be opposite to the charge polarity of the photocurable material 75 that is layered, so as to improve the attraction effect of the photocurable material 75 that is layered on the wheel hub 21. In addition, due to such arrangement, when the electrostatic latent image of the developing drum 36 selectively attracts a certain region of the photocurable material 75 that is layered, the photocurable material 75 that is layered in an adjacent area will not be affected, so as not to affect the printing accuracy. Furthermore, such arrangement helps to attract and pull the photocurable material 75 that is layered to become more uniform in thickness. It is also possible to adjust the thickness of the thin layer by controlling the electric field intensity of the first electrode 22. When the material layer 79 that is selectively attracted to the developing drum 36 rotates and arrives between the developing drum 36 and the platform 51 or the cured model 71 on the platform 51, the curing light beam 38 passes through the electroconductive layer 12 and the photoconductive layer 11 to irradiate and cure the material layer 79, and then the cured material layer 79 is attached to the platform 51 and peeled off and separated from the developing drum 36. The developing assembly 10 shown in the figures is movable along an arrow 91. The platform 51 moves a set distance along an arrow 93 according to information of the model to be printed, so the material layers 79 are stacked and cured layer by layer and finally, the cured model 71 is formed. A scraper 27 is arranged outside the wheel hub 21, as shown in the figures, to better control the layer thickness of the photocurable material 75 that is layered, such that electrostatic latent image can perform attraction with the better precision. The scraper 27 is provided downstream from the material box 24, and upstream (or downstream) from the second electrostatic generator 23. A light shield 35 may be provided inside the developing drum 36, as shown in the figures, to avoid the developing beam 39 or the curing light beam 38 to irradiate regions that do not need to be irradiated, thereby ensuring that the electrostatic latent image on the developing surface of the developing drum 36 is accurate and clear, and preventing the material layer 79 or the photocurable material 75 that is layered from being irradiated and cured by mistake during the rotation.

Embodiment 4

Figure 5:
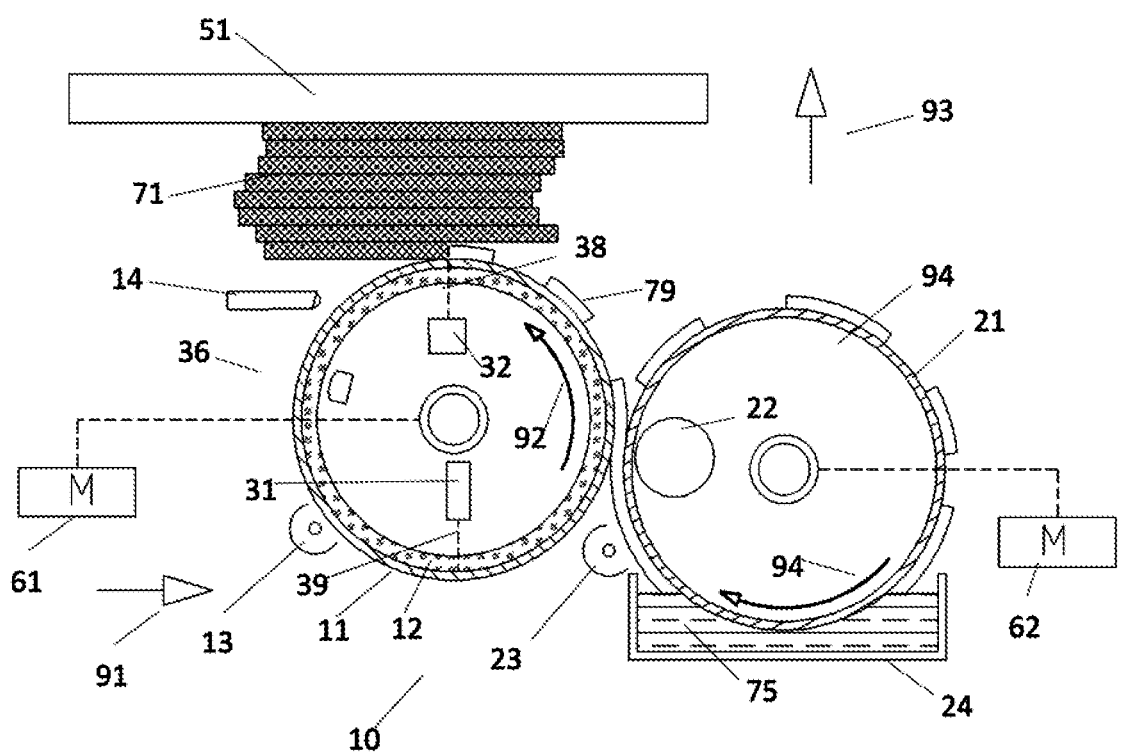
FIG. 5 is a schematic diagram of a photocuring printing system according to an embodiment of the present application.

The embodiment shown in FIG. 5 differs from the embodiment shown in FIG. 4 in that the platform 51 is arranged above the developing assembly 10. The wheel hub 21 of the feeder 2 rotates along an arrow 94 to drive the photocurable material 75 to become layered. The second electrostatic generator 23 generates uniformly distributed charges. The wheel hub 21 and the developing drum 36 are controlled to match with each other. The photocurable material 75 that is layered is selectively attracted by the electrostatic latent image of the developing drum 36. The remaining photocurable material 75 that is layered on the wheel hub 21 continues to rotate and returns into the material box 24 for recycling. The first electrode 22 may be roller-shaped as shown in the figures. The first electrode 22 is arranged at an inner side of the wheel hub 21 and close to the developing drum 21. In the embodiment shown in FIG. 5, the first electrode 22 that is roller-shaped performs the attraction of the photocurable material 75 that is layered only when the photocurable material 75 is transferred to the developing drum 36, which is different from the arrangement in the embodiment shown in FIG. 4 that the first electrode 22 that is ring-shaped can attract the photocurable material 75 that is layered along the circumference.

When the material layer 79 is between the developing drum 36 and the platform 51 or the cured model 71 on the platform 51, for example, the material layer 79 is in contact with both of the developing drum 36 and the platform 51 or the cured model 71 on the platform 51, the curing light beam 38 passes through the electroconductive layer 12 that is transparent and the photoconductive layer 11 and goes toward the platform 51 to irradiate the material layer 79 to cure and attach it to the platform 51 or the cured model 71 on the platform 51. Due to this structure, the photocurable material that is liquid is prevented from flowing to the carrier, in addition, a thickness of the material layer 79 can be precisely controlled during curing to realize precise printing.

Embodiment 5

Figure 6:
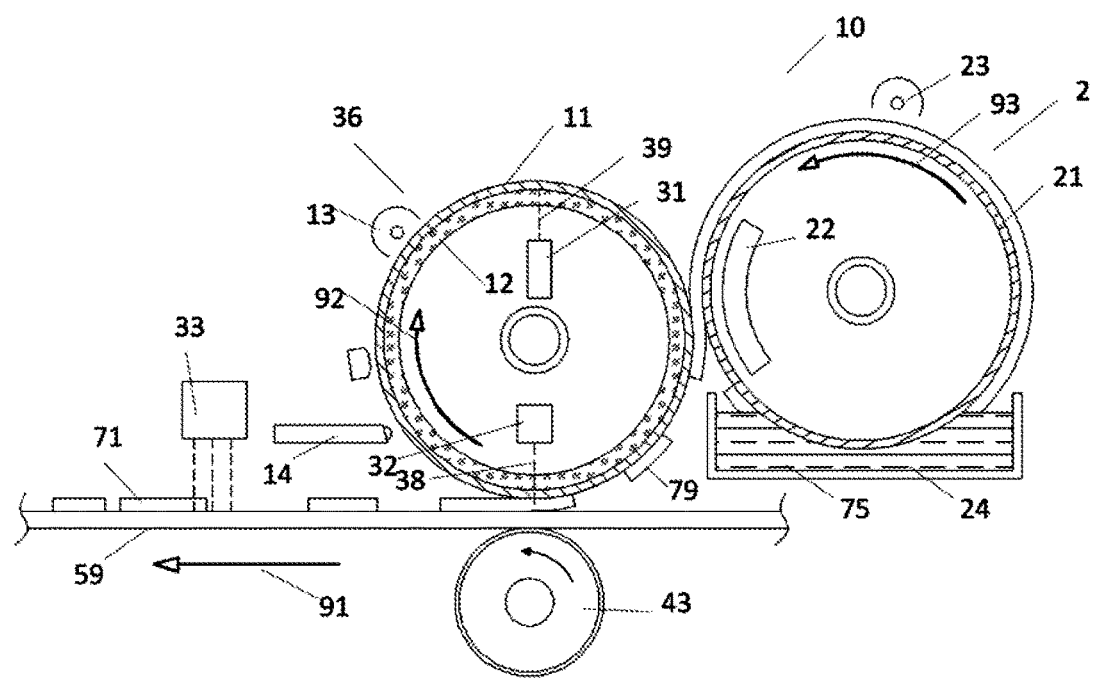
FIG. 6 is a schematic diagram of a photocuring printing system according to an embodiment of the present application.

The carrier shown in FIG. 6 is a paper 59. The developing assembly 10 can be used to perform printing on the paper. The developing drum 36 rotates along an arrow 92 and selectively attracts the photocurable material conveyed by the feeder 2 according to the electrostatic latent image to form a material layer 79. At the same time, the paper 59 moves along an arrow 91. The developing drum 36 and the paper 59 are controlled to match with each other, that is, the developing drum 36 performs pure rolling on the paper 59. The curing light beam 38 emitted by the curing light source 32 passes through the developing drum 36 and goes toward the paper 59 to irradiate the material layer 79 for curing. The cured material layer 79 is attached to the paper 59, at the same time, peeled off and separated from the developing drum 36. Optionally, an additional curing light source 33 is provided along a direction in which the paper 59 moves, which can further help the material layer to be cured and bonded to the paper 59.

The first electrode 22 which is arranged at an inner side of the wheel hub 21 and is close to the developing drum 36 may be arc-shaped, as shown in FIG. 6, thereby facilitating adjustment of the attraction range. In this embodiment, the carrier can be a paper 59, a plastic film, a fabric, or any other sheet materials that can be used for printing patterns thereon. A roller-shaped electrode 43 is arranged on a side of the paper away from the developing drum 36. Due to the electric field of the corresponding polarity formed by the roller-shaped electrode 43, the material layer 79 is attracted and bonded to the paper 59. In this embodiment, the cured model 71 is a pattern layer bonded to the paper 59. A surface of the paper 59 can be considered to be flat.

Embodiment 6

Figure 7:
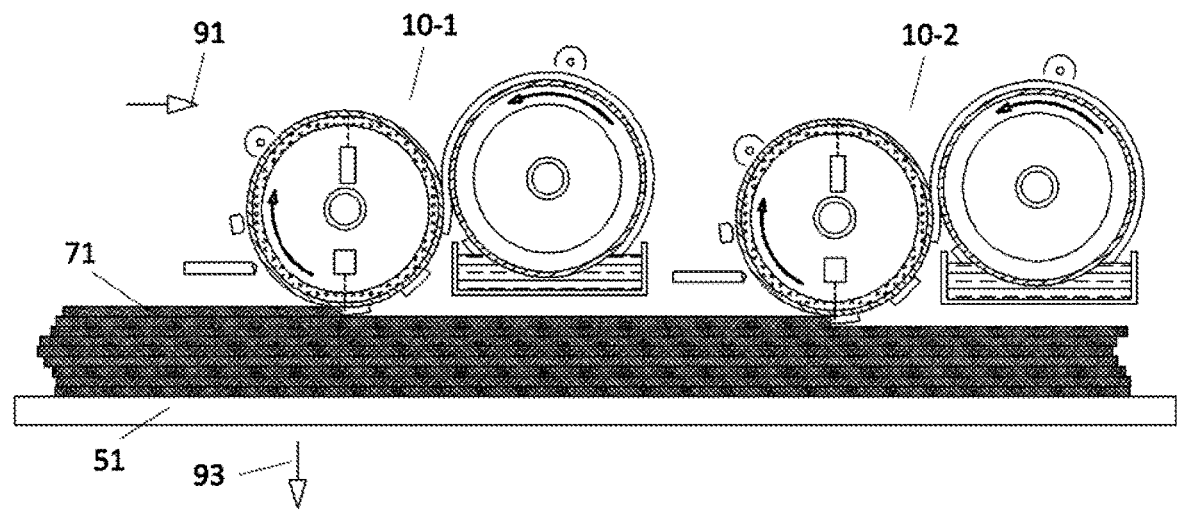
FIG. 7 is a schematic diagram of a photocuring printing system according to an embodiment of the present application.

As shown in FIG. 7, a plurality of developing assemblies 10 can be provided to perform the printing simultaneously. For example, a developing assembly 10-1 and a developing assembly 10-2 are provided to simultaneously apply the material layer 79 on different layers on the platform 51. These layers are respectively irradiated and cured, thereby improving the printing speed.

Embodiment 7

Figure 8:
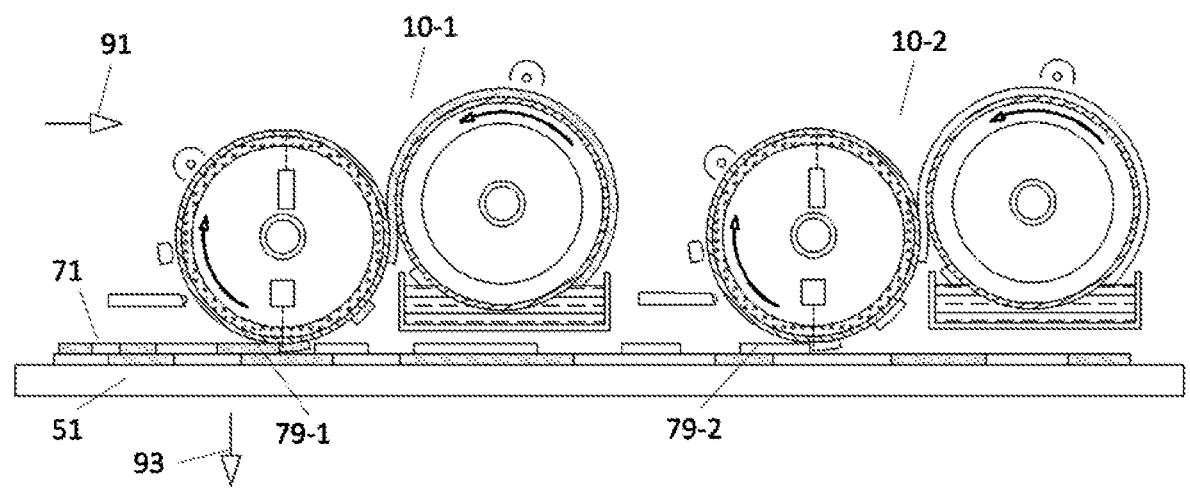
FIG. 8 is a schematic diagram of a photocuring printing system according to an embodiment of the present application.

FIG. 8 illustrates that a plurality of developing assemblies 10 are used to print different materials, so as to form a composite material model. For example, the developing assembly 10-1 prints a material layer 79-1, and the developing assembly 10-1 prints a material layer 79-2. For example, the material layer 79-1 serves as a support material, and the material layer 79-2 serves as a model material, or their colors are different, such that these two materials can match with each other in the same printing layer to form a composite material model or a color model. Of course, it is also possible to use more than two developing assemblies 10 to perform the printing, so as to form a model having more colors or a model prepared from more materials.

Embodiment 8

Figure 9:
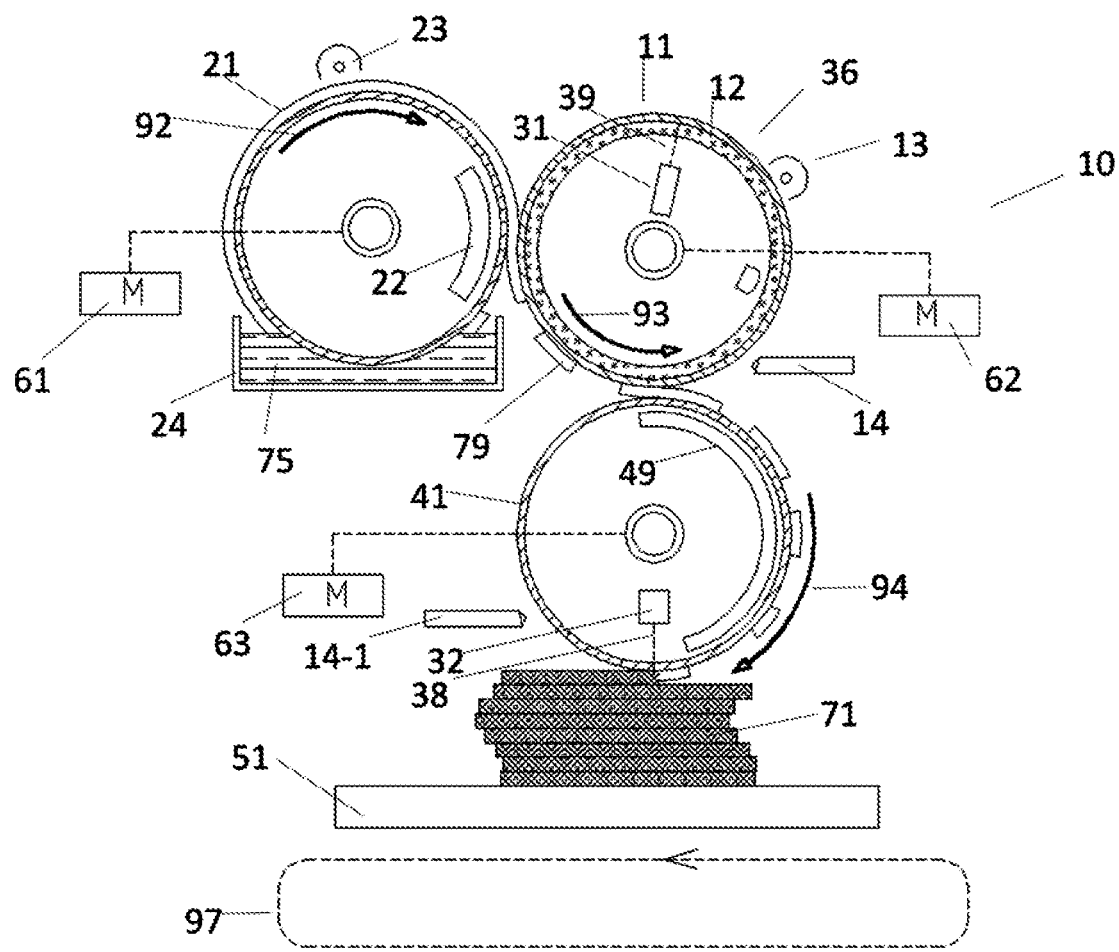
FIG. 9 is a schematic diagram of a photocuring printing system according to an embodiment of the present application.

In the foregoing embodiments, the material layer 79 is directly applied on the carrier by the developing drum 36. Whereas, it is possible to apply the material layer 79 in an indirect manner. As shown in FIG. 9, the material layer 79 formed on the developing assembly 10 can be transferred to the platform 51 by a conveying mechanism. For example, the conveying mechanism as shown in FIG. 9 is a conveying drum 41 that is light-transmissive (i.e., optically transparent). The conveying drum 41 is driven by a driver 63 to rotate along an arrow 94. The conveying drum 41 and the developing drum 36 synchronously rotate in reverse and are controlled to match with each other, that is, the conveying drum 41 and the developing drum 36 perform pure rolling with respect to each other, and their spacing is controlled to be appropriate, so that the material layer 79 formed by the developing assembly 10 can be accurately transferred to a material layer attachment surface of the conveying drum 41, i.e., a surface of the conveying drum 41 on which the material layer 79 is attracted and from which the material layer 79 is transferred. The developing assembly 10 and the conveying drum 41 are constituent parts of a forming assembly. The forming assembly may also include a curing light source 32. When the material layer 79 rotates and arrives between the conveying drum 41 and the platform 51 or the cured model 71 on the platform 51, the curing light beam 38 emitted by the curing light source 32 passes through a material-laying side of the conveying drum 41 that is transparent to irradiate the material layer 79, and then the material layer 79 is cured and bonded to the platform 51 or the cured model 71 on the platform 51, and peeled off and separated from the conveying drum 41. The material-laying side of the conveying drum 41 refers to a side of the conveying drum 41 facing to the platform 51, i.e., a bottom of the conveying drum 41 as shown in FIG. 9. The curing light source 32 may be arranged inside the conveying drum 41 and move together with the conveying drum 41 and the developing assembly 10, or the curing light source 32 may be arranged outside the conveying drum 41, in this case, by a lens system or other means, the curing light beam 38 can pass through the conveying drum 41 that is transparent and irradiate toward the platform 51. Optionally, the curing light source 32 does not move with the conveying drum 41 and the developing assembly.

The use of the conveying drum 41 can prevent the developing drum 36 from contacting the platform 51 or the cured model 71, so as to protect the developing drum 36 and prolong its service life. In addition, the developing light source 31 and the curing light source 32 can be arranged in different drums, which is more convenient for the arrangement of the light sources. Or, a diameter of the developing drum 36 can be reduced, so its structure is compact or the cost is reduced. In addition, the developing drum 36 does not need to be transparent, for example, the photoconductive layer 11 is not light-transmissive. If the developing light beam 39 emitted by the developing light source 31 passes through the electroconductive layer 12 that is transparent from an interior of the developing drum 36 through the transparent conductive layer 12 to irradiate the photoconductive layer 11 and form an electrostatic latent image, in this way, the developing light beam 39 does not irradiate the material layer 79 on an outer surface of the developing drum 36, and the developing light beam 39 is freely arranged at an inner circumferential position, so as to better protect the material layer 79 or the photocurable material 75 that is layered from being irradiated by the developing light beam by mistake, thereby improving the reliability and durability of the system. Optionally, the electroconductive layer 12 may be not light-transmissive, in this case, the developing light beam 39 emitted by the developing light source 31 can directly irradiate the photoconductive layer 11 on the outside to form an electrostatic latent image, which can simplify the structure of the developing drum 36 and reduce the difficulty of manufacturing the developing drum 36.

The platform 51 reciprocates along a rectangular track 97, and after each cycle, the platform 51 is lowered by a layer thickness distance, so that the forming assembly does not need to move, which is more conducive to the control of the forming assembly. Of course, the forming assembly may also move horizontally, and the platform 51 will lower a layer thickness distance after one layer is printed. A second electrode 49 is arranged at an inner side of the conveying drum 41, as shown in the figures, to form an electric field of corresponding polarity (i.e., reverse to the charge's polarity of the material layer 79) to attract the material layer 79 onto the conveying drum 41. For example, the second electrode 49 is arc-shaped and extends to a position close to the material-laying side of the conveying drum 41 from an area close to the developing drum 36 along a rotational direction of the conveying drum 41, but the second electrode 49 can be at a position appropriately far away from the material-laying side of the conveying drum 41, so that the attraction of the second electrode 49 can be cancelled, or reduced when the material layer 79 is transferred to the platform 51. A cleaning device 14 may be arranged downstream from the material-laying side of the conveying drum 41 and upstream from the developing drum 36 along a rotational direction of the conveying drum 41 to clean the material layer or other impurities remaining on the surface of the conveying drum 41. Of course, another cleaning device 14 can be provided between a material layer separation side of the developing drum 36 and the developing engine to clean the surface of the developing drum 36.

Embodiment 9

Figure 10:
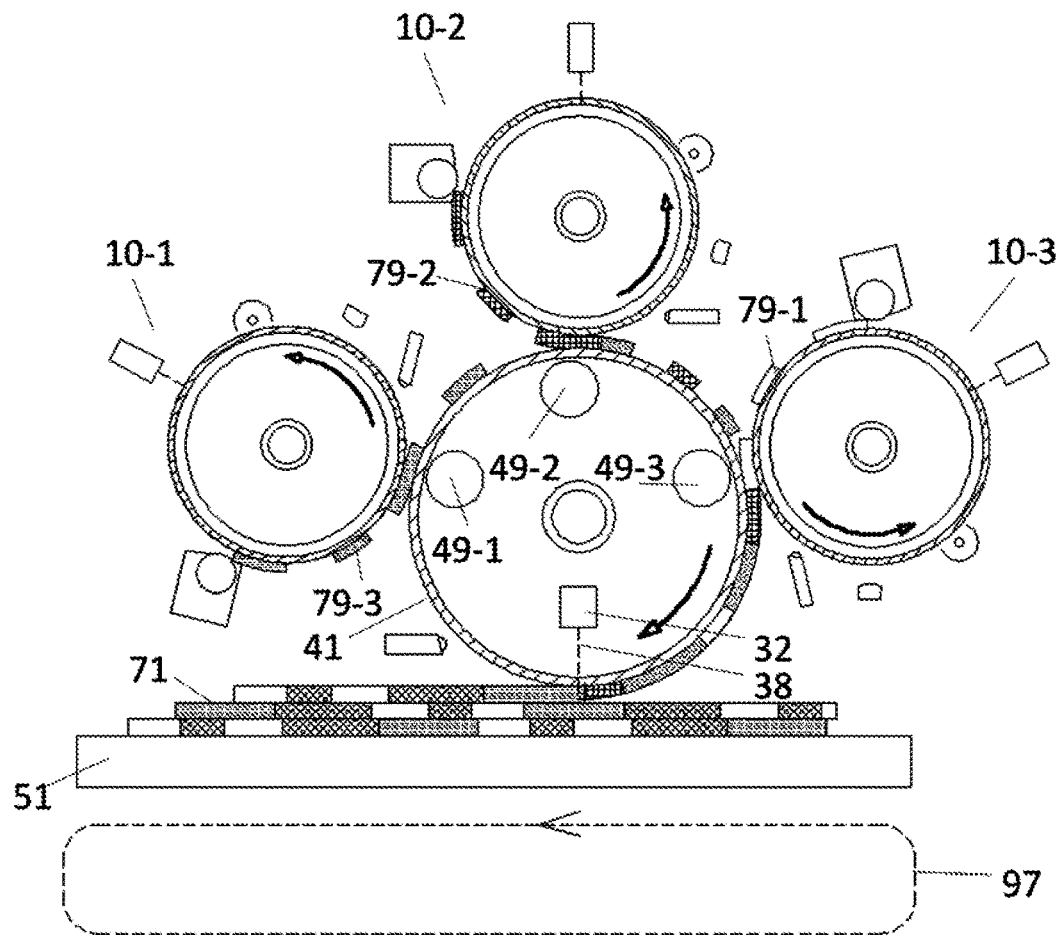
FIG. 10 is a schematic diagram of a photocuring printing system according to an embodiment of the present application.

As shown in FIG. 10, a plurality of developing assemblies 10 are provided and simultaneously matches with the conveying drum 41 that is light-transmissive (i.e., optically transparent). For example, a developing assembly 10-1, a developing assembly 10-2 and a developing assembly 10-3 are provided to respectively match with the conveying drum 41, that is, the developing drum 36 of each developing assembly 10 and the conveying drum 41 rotate in opposite directions, and their speed and spacing are reasonably controlled, so that pure rolling is performed when the material layers 79-1, 79-2 and 79-3 are conveyed to the conveying drum 41 from the corresponding developing drums, in addition, the material layers may be not stacked, pulled, wrinkled or deformed, thereby improving the printing accuracy.

The material layers of respective developing assemblies 10 are transferred to the conveying drum 41 to form a combination layer of the material layers. After being conveyed to the platform 51 by the conveying drum 41, the combination layer of the material layers is irradiated and cured to be attached to the platform 51 or the cured model 71 on the platform 51 and be peeled off and separated from the conveying drum 41. In the present embodiment, the material layers are conveyed to the conveying drum 41 by the plurality of developing assemblies 10, and then conveyed to the platform 51 by the conveying drum 41. By controlling the positional relationship and movement of the developing drum 36 and the conveying drum 41, the precise transfer of the material layer can be easily realized, so as to improve the accuracy of matching composite materials or materials of different colors, thereby improving the accuracy of printing the cured model 71 with color/grey pattern or the cured model 71 prepared from composite materials. In addition, the plurality of developing assemblies 10 simultaneously convey the material layers, which can also increase the speed of printing composite material models or color models. In the figures, a plurality of second electrodes 49 are arranged inside the conveying drum 41 and each close to the corresponding developing drum 36. The second electrodes 49 may be roller-shaped. It can be seen from the figures that a second electrode 49-1 corresponds to the developing assembly 10-1, and a second electrode 49-2 corresponds to the developing assembly 10-2 and a second electrode 49-3 corresponds to the developing assembly 10-3. The second electrodes may have a higher voltage and forms an electric field to attract the corresponding photocurable material 75 to a material layer attachment surface of the conveying drum 41. The second electrodes 49-1, 49-2 and 49-3 can also be combined into an arc-shaped second electrode, just as the second electrode 49 shown in FIG. 14.

Embodiment 10

Figure 11:
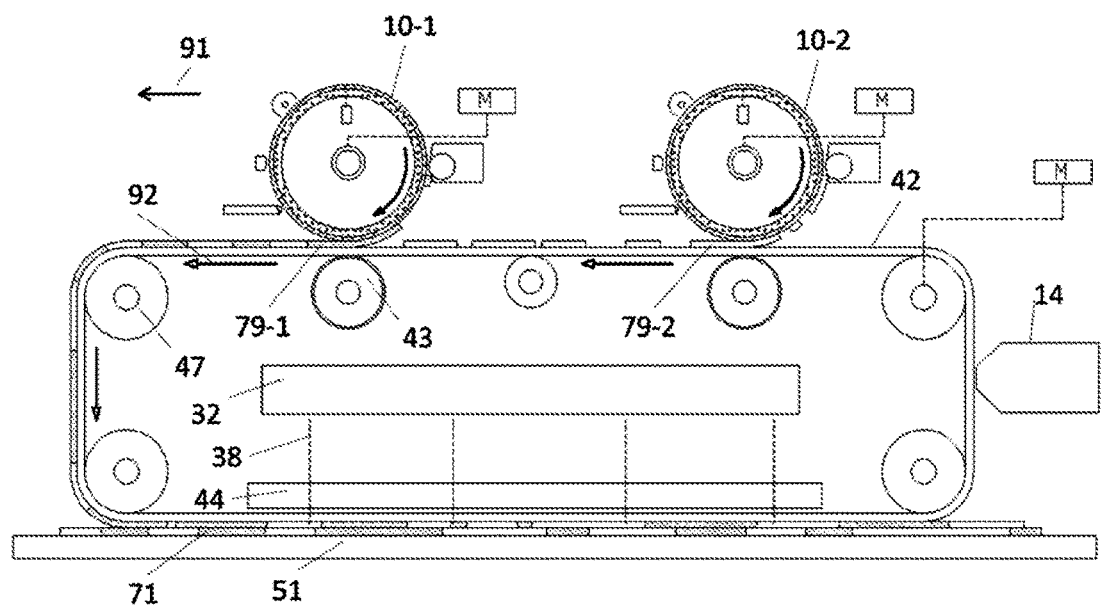
FIG. 11 is a schematic diagram of a photocuring printing system according to an embodiment of the present application.

As shown in FIG. 11, the conveying mechanism can be a conveyor belt 42 that is circularly movable. The conveyor belt 42 is made of light-transmissive (transparent) materials. The conveyor belt 42 is supported and driven to circularly rotate by at least two rollers 47. FIG. 11 schematically shows four rollers which can support the conveyor belt 42 to rotate along an arrow 94. The material layer 79-1 is transferred by the developing assembly 10-1 to a material layer attachment surface of the conveyor belt 42, and then transferred to the platform 51 by the conveyor belt 42. The conveyor belt 42 can have a larger plane area, so a larger light-transmissive (i.e., optically transparent) area can be realized. For example, the curing light beam 38 emitted by the curing light source 32 passes through plane areas of the conveyor belt 42 that are parallel to the platform 51 and irradiates toward the platform 51, which can greatly increase the curing speed of the material layer 79, thereby increasing the printing speed. In addition, a plurality of developing assemblies 10 can also be used. For example, a developing assembly 10-2 can also be provided to transfer the material layer 79-2 to the conveyor belt 42 to print composite material models or color models. As shown in FIG. 11, a roller-shaped electrode 43 is arranged at a side of the conveyor belt 42 that is away from the developing drum 36. The roller-shaped electrode 43 can form a corresponding electric field to attract the material layer 79 onto the conveyor belt 42. In addition, due to the cooperation of the roller-shaped electrode 43 and the corresponding developing drum, a distance between the conveyor belt 42 and the developing drum can be better controlled, thereby improving the printing accuracy. A cleaning device 14 can also be provided downstream from the material-laying side of the conveyor belt 42 to clean the surface of the conveyor belt 42. In order to maintain the flatness of the plane areas of the conveyor belt 42 and control the distance between the plane areas and the platform 51, a transparent plate 44 which slidably fits the conveyor belt 42 is provided.

Embodiment 11

Figure 12:
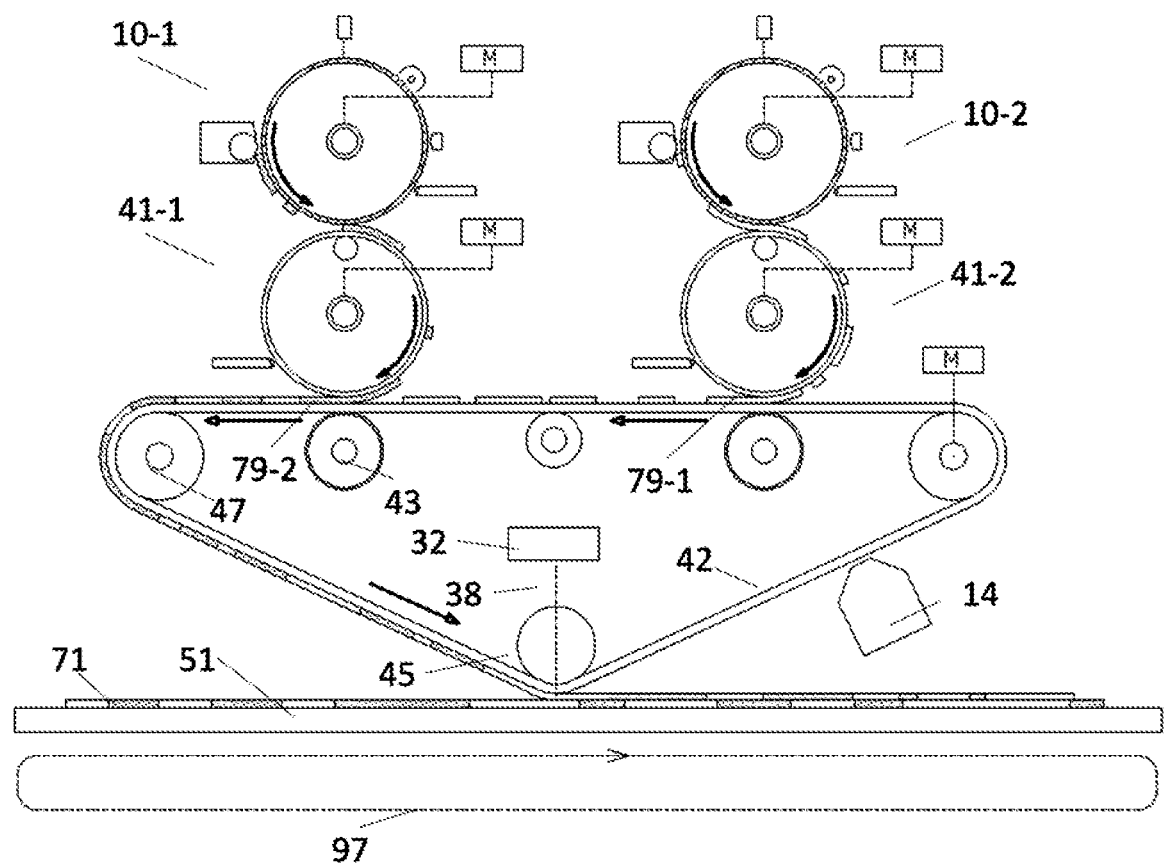
FIG. 12 is a schematic diagram of a photocuring printing system according to an embodiment of the present application.

The embodiment shown in FIG. 12 differs from the embodiment shown in FIG. 11 in that the material layer 79 of the developing drum 36 can be first conveyed to the conveying drum 41, and then conveyed by the conveying drum 41 to the conveyor belt 42, and then conveyed to the platform 51 by the conveyor belt 42, which can improve the flexibility of the system, and help to protect the developing drum 36, in addition, positions and rotational speed of the conveying drum 41 and the developing drum 36 are controlled more precisely. The use of the conveyor belt 42 allows the arrangement of a plurality of conveying drums or developing drums to be more convenient, so that it is easier to print complex models of composite materials or having different colors or the printing is performed with higher speed. In the present embodiment, the conveying drum 41 may not be light-transmissive, and the conveyor belt 42 is light-transmissive.

In addition, the conveyor belt 42 in this embodiment is supported by three rollers, where a roller 45 that is transparent is provided at a bottom of the conveyor belt 42 to press the conveyor belt 42 toward the platform 51. The curing light beam 38 can pass through the roller 45 that is transparent and the conveyor belt 42 and irradiate toward the platform 51, and then the material layer 79 is laid and cured on the platform 51 at the same time. After the conveyor belt 42 is driven by the roller 45 that is transparent, its direction of the movement varies greatly, which helps the material layer 79 to peel off and separate from the conveyor belt 42, thereby improving the printing speed.

FIG. 12 schematically shows a developing assembly 10-1 that corresponds to a conveying drum 41-1 and a developing assembly 10-2 that corresponds to a conveying drum 41-2. Such arrangement enables the corresponding material layer 79 of different materials or having different colors to be transferred to a material layer attachment surface of the conveyor belt 42, thereby realizing the printing of composite material models or color models.

Embodiment 12

Figure 13:
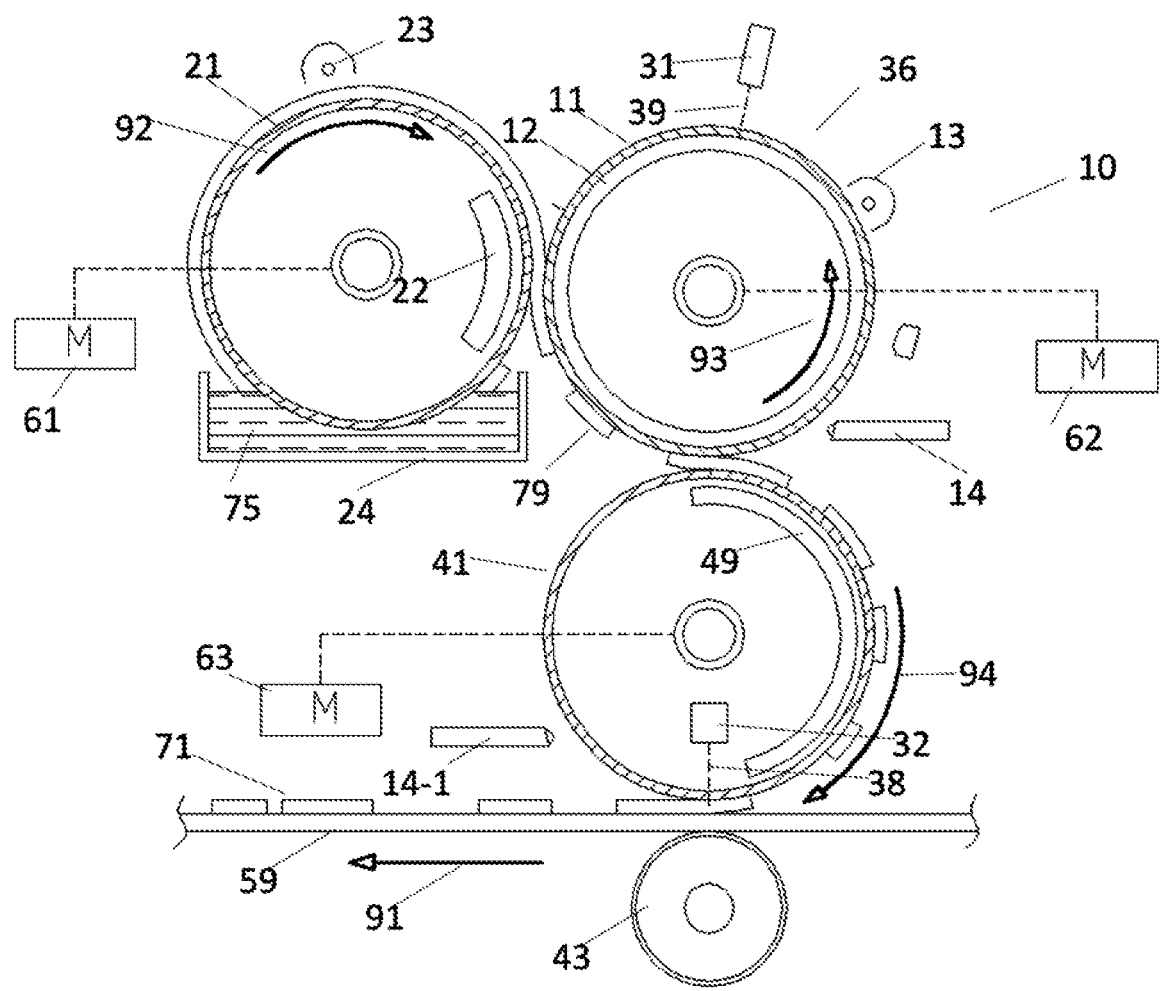
FIG. 13 is a schematic diagram of a photocuring printing system according to an embodiment of the present application.

FIG. 13 schematically shows that a material layer 79 formed by a developing assembly 10 is conveyed by a conveying drum 41 to a surface of a carrier, i.e., a paper 59. and then is irradiated and cured by a curing light beam 38 which passes through the conveying drum 41 that is transparent. The cured material layer 79 is attached to the paper 59 to form a cured model 71 with a thin layer pattern. The conveying drum 41 is adopted to transfer the material layer 79, which can better protect the developing drum 36 and avoid the wear caused by the contact with the paper 59.

Optionally, the roller-shaped electrode 43 can heat the paper 59 and the material layer 79 to accelerate the combination. Due to the use of the conveying drum 41, the developing drum 36 is not heated.

Figure 14:
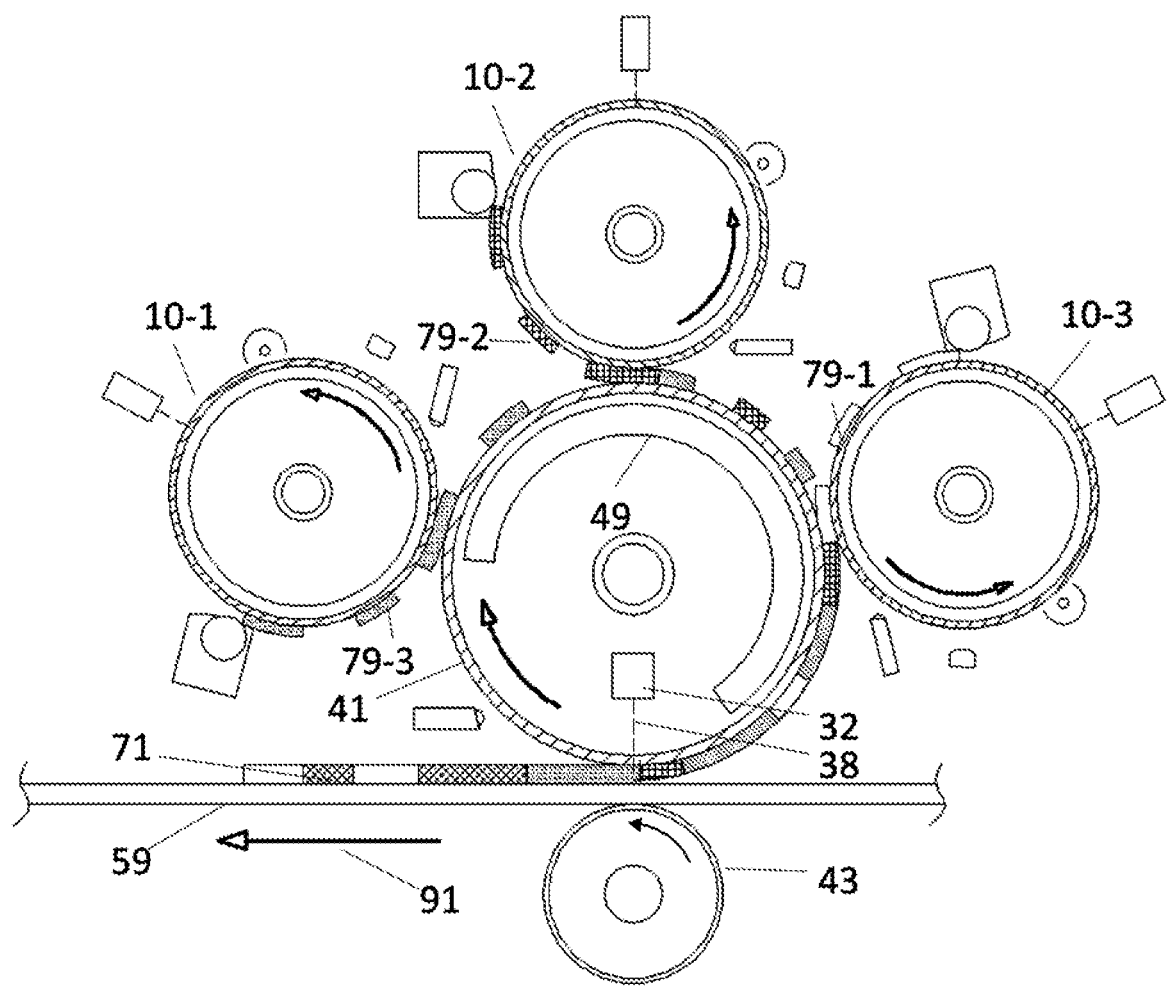
FIG. 14 is a schematic diagram of a photocuring printing system according to an embodiment of the present application.

In addition, a plurality of developing assemblies 10 can be provided to synchronously cooperate with the conveying drum 41, which is similar to the embodiment shown in FIG. 14, thereby realizing the printing of color patterns and improving the speed of printing the color patterns.

In FIG. 14, a developing engine 10-1 corresponds to a material layer 79-1, and a developing engine 10-2 corresponds to a material layer 79-2 and a developing engine 10-3 corresponds to a material layer 79-3. Assuming that these three photocurable materials are photocurable resin and are cyan, magenta and yellow, respectively, the printing of the color patterns on the paper 59 can be realized, in addition, compared to traditional laser printers, the system of the present application involves the use of photo-curing which has a higher forming speed than heating and cooling, and thus the printing of the color patterns can be realized with a higher speed.

Embodiment 13

Figure 15:
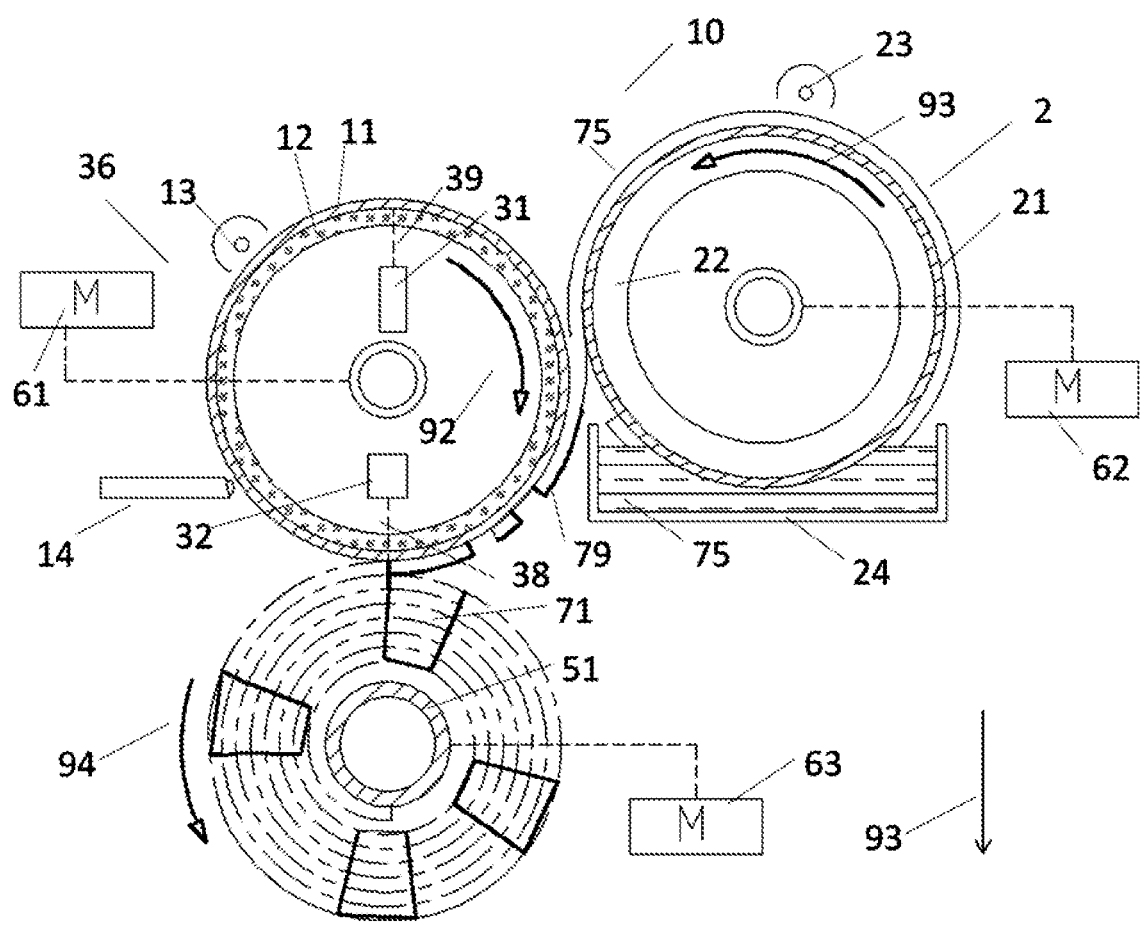
FIG. 15 is a schematic diagram of a photocuring printing system according to an embodiment of the present application.

FIG. 15 illustrates that the carrier may also adopt a drum-shaped platform 51 with a forming surface that is cylindrical. The platform 51 and the developing drum 36 synchronously match with each other. The platform 51 is rotatable around its central axis. The central axis of the platform 51 and an central axis of the developing drum 36 may be basically parallel. The developing drum 36 and the carrier rotate with respect to each other by respective rotations of the developing drum 36 and the carrier, and the developing drum 36 and the platform 51 (or the cured model on the platform 51) may purely roll without slippage with respect to each other, which improves the forming accuracy. The material layer 79 is directly or indirectly transferred to the platform 51 by the developing drum 36 that rotates, specifically transferred to a forming surface of the platform 51. The forming surface refers to a surface of the platform 51 on which the material layer is applied. The curing light beam 38 passes through a material-laying side of the developing drum 36 and irradiates the material layer 79 for the curing treatment, thereby forming cured layers.

During the printing, the developing assembly 10 and the platform 51 are separated from each other by enlarging their distance step by step or continuously, and such separation can be realized by only moving the platform 51 along an arrow 93 or only moving the developing assembly 10 in an opposite direction of the arrow 93 or moving both of the platform 51 and the developing assembly 10.

The material layer 79 can be directly transferred to the platform 51 by the developing drum 36, which is realized by synchronously matching the developing drum 36 and the platform 51 (as shown in the figures), and the developing drum 36 and the platform 51 (or the cured model on the platform 51) purely roll without slippage with respect to each other, which improves the forming accuracy. In addition, the material layer 79 can be indirectly transferred to the platform 51 by the developing drum 36, which is realized by the way that the conveying mechanism (such as the conveyor drum 41 or the conveyor belt 42) synchronously matches with the developing drum 36 and the platform 51 respectively, and the material layer on the developing drum 36 is transferred to the platform 51 via the conveyor drum 41 or the conveyor belt 42. The conveyor drum 41 (or the conveyor belt 42) and the platform 51 (or the cured model on the platform 51) purely roll without slippage with respect to each other, which improves the forming accuracy.

During the printing, when the developing assembly 10 and the platform 51 continuously and vertically move away from each other, for example, the platform 51 continuously moves along the arrow 93, or a forming assembly continuously moves in the opposite direction of the arrow 93. The material layers 79 are stacked layer by layer on the platform 51 in the form of a spiral or are wound and stacked in the form of a worm, and then are irradiated and cured to form the cured model 71. During the printing, the platform 51 or the developing assembly 10 does not need to reciprocate. The material layers 79 can be continuously stacked on the platform 51. The developing drum 36 or the material layer attachment surface of the conveying mechanism can continuously rotate in their own set directions, which can greatly improve the speed and the stability of the printing. In this way, a model that can be set on the platform 51 or a ring-shaped model can be printed with better effect. In addition, models with a small size can be circumferentially arranged on the platform 51 for printing, just like cured models 71 shown by dark solid lines in FIG. 15.

Embodiment 14

Figure 16:
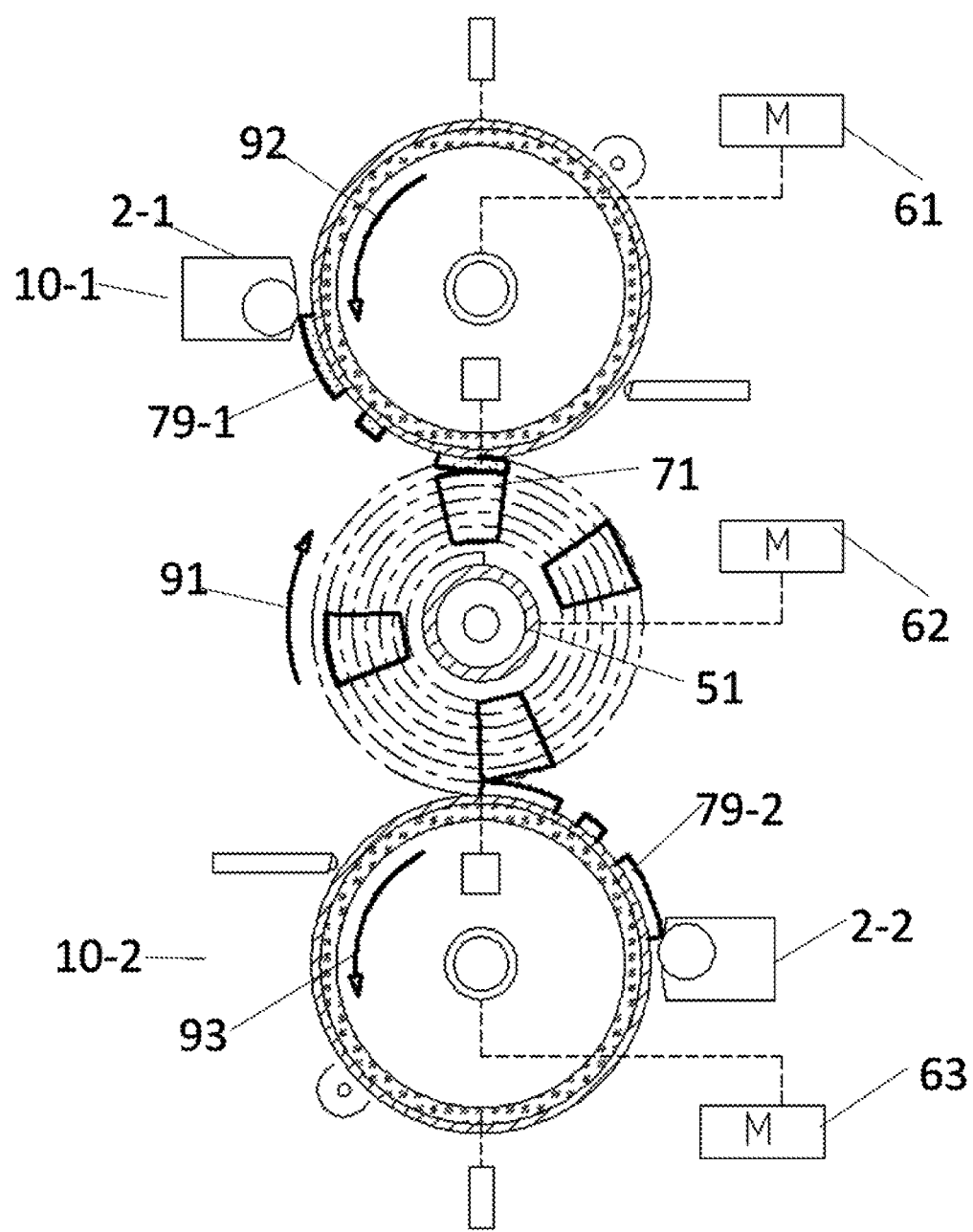
FIG. 16 is a schematic diagram of a photocuring printing system according to an embodiment of the present application.

FIG. 16 schematically shows that a plurality of developing assemblies 10 simultaneously cooperate with the platform 51 that is drum-shaped, so as to realize the printing of composite material models or color models. Of course, two layers can be printed at the same time, that is, two developing drums 36 apply the material layers 79 on different layers, as shown in FIG. 7, to increase the printing speed, where FIG. 7 can be considered an illustration in which the platform 51 that is drum-shaped is unfolded in a plane shape. During the printing process, a developing engine 10-1 and a developing engine 10-2 respectively move away from the platform 51, such as in a continuous manner. Optimally, during the printing process, the rotational angular velocity of the platform 51 that is drum-shaped can be reduced to ensure that a linear velocity of a profile of photocurable materials laid on the platform 51 corresponding to the developing drum 36 is constant under the condition that the rotational speed of the developing drum 36 is constant, thereby steadily and accurately applying the material layers 79 on the platform 51.

Embodiment 15

Figure 17:
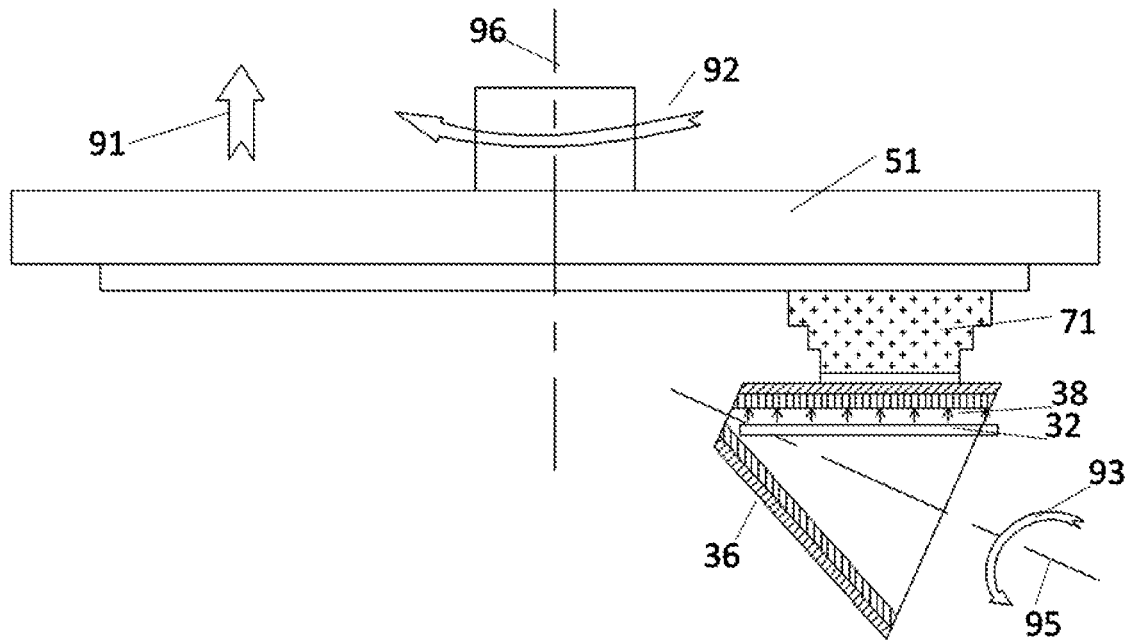
FIG. 17 is a schematic diagram of a photocuring printing system according to an embodiment of the present application.

FIG. 17 schematically shows a carrier which is a platform 51 that is disc-shaped. The platform 51 has a forming surface with a circular or annular plane. The platform 51 is rotatable around its central axis (i.e., an axis 96) and along an arrow 91. The developing drum 36 (or the conveying mechanism) and the carrier are horizontally rotatable with respect to each other around the center axis of the carrier. The developing drum 36 is in the shape of a truncated cone. The developing drum 36 and the platform 51 synchronously match with each other, for example, the developing drum 36 rotates around its central axis (i.e., an axis 95) and along an arrow 92, and the platform rotates along the arrow 91. The developing drum 36 and the platform 51 are set to have appropriate rotational speeds and spacing, and a surface region of the developing drum 36 near the platform 51 is parallel to the platform 51, and these arrangements can realize that the material layer 79 on the developing drum 36 is transferred to and applied on the platform 51 in a pure rolling manner, and the material layers do not be stacked, pulled, wrinkled or deformed, thereby improving the accuracy and speed of the printing.

Embodiment 16

Figure 18:
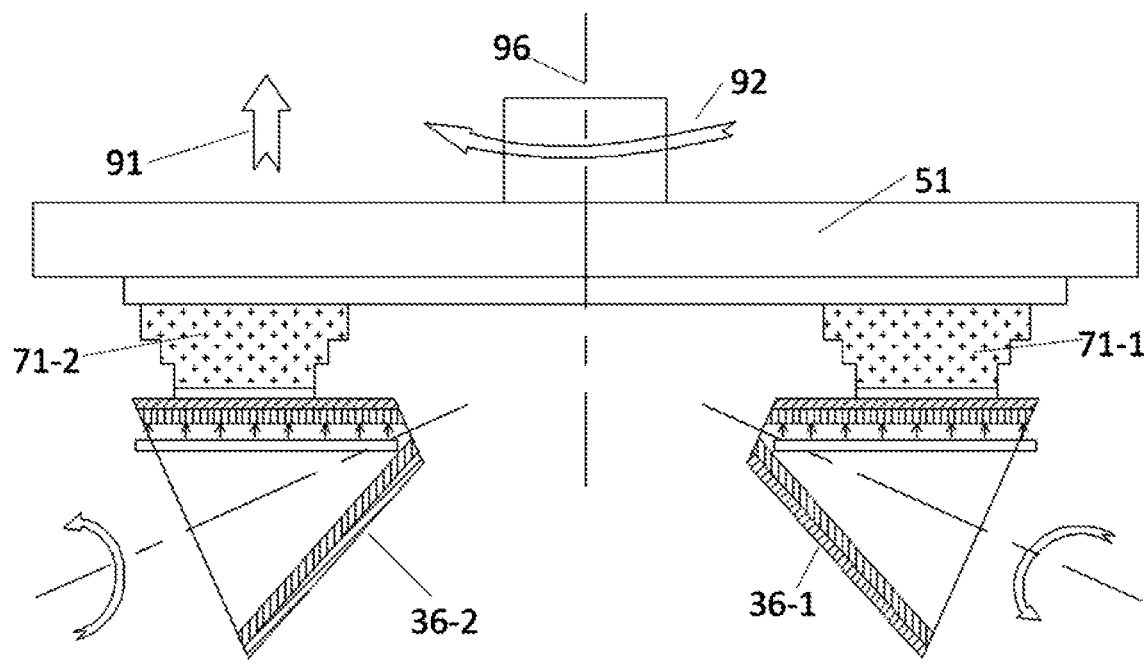
FIG. 18 is a schematic diagram of a photocuring printing system according to an embodiment of the present application.

FIG. 18 schematically shows that the material layers 79 are transferred to the platform 51 that is disc-shaped and cured using a plurality of developing assemblies 10 simultaneously. If the material layers in the same layer are printed at the same time, the printing of composite material models or color models can be realized. If the material layers in different layers are printed at the same time, the platform 51 and the developing assembly 10 can move away from each other at a higher speed. For example, the platform 51 moves along an arrow 93 at twice the speed of the developing assemblies in the embodiment 2 shown in FIG. 17, which can greatly increase the printing speed.

In the printing process of the embodiments shown in FIGS. 17 and 18, if the platform 51 continuously moves along the arrow 93, the material layer 79 can be stacked on the platform 51 in the form of a spiral followed by curing to form a cured model 71. During which, the platform 51 or the developing assembly 10 does not need to reciprocate. The material layers 79 can be continuously stacked on the platform 51. The developing drum 36 or the material layer attachment surface of the conveying mechanism can continuously rotate in their own set directions, which can greatly improve the speed and the stability of the printing. In this way, a ring-shaped model can be printed with better effect. In addition, models with a small size can be circumferentially arranged on the platform 51 for printing.

The printing may be performed through the following steps.

Step 1: The Forming of an Electrostatic Latent Image

Referring to embodiments shown in FIGS. 1 and 2, the electrostatic latent image imaging process includes an electrostatic charging process and a pixel-wised exposure imaging process, which are specifically described as follows.

1) Electrostatic Charging Process

While the developing drum 36 rotates along an arrow 92, a surface of the developing drum 36 is charged with negative charges (or positive charges) by a first electrostatic generator 13. The first electrostatic generator may perform charging by corona wires, corona tubes, grid-controlled corona, charging rollers or other charging methods.

2) Exposure and Imaging Process

While the developing drum 36 rotates, the developing light source 31 selectively irradiates the surface of the developing drum. The photoconductive layer 11 of the developing drum 36 is prepared from photoconductive materials and has a high resistivity without light irradiation. When the photoconductive layer 11 is pixel-wised exposure to the developing light beam, the resistivity of an irradiated region is significantly reduced, electric charges on a surface of the irradiated region are removed due to the conduction of the electroconductive layer 12 that may be transparent, while electric charges on regions without light irradiation remain the same, so that the electrostatic latent image is formed on the developing surface of the developing drum 36. The developing light source 31 may adopt a laser or a light emitting diode (LED) or other light sources to selectively control irradiated points, thereby forming irradiation with a dot matrix bitmap on the surface of the developing drum 36.

Referring to the embodiment shown in FIG. 3, ionography is implemented. Specifically, the developing engine includes an ion-deposition device 34. The charging process and the exposure imaging process mentioned above can be combined into one step, i.e., ion or electron deposition is selectively performed on the developing surface of the drum 36 to directly form an electrostatic latent image.

The photoconductive layer 11 is prepared from photoconductive materials such as organic photoconductive materials (photoconductive polymer) including polyvinyl carbazole, a micro-nano array that can form photoelectric materials and inorganic photoconductive materials including selenium, cadmium sulfide, zinc oxide, amorphous silicon and zinc oxide. The photoconductive material has the varied resistivity by light irradiation according to the photoconductive effect. The electroconductive layer 12 that is transparent can be made of indium tin oxide materials, aluminum-doped zinc oxide or other transparent and electroconductive materials.

Step 2: Development Process

The process of forming a developing pattern by the electrostatic latent image is accomplished according to the principle that same charges repel each other while opposite charges attract. The photocurable material 75 is accommodated in the feeder 2. When a partial surface of the developing drum 36 with the electrostatic latent image is rotated to the feeder 2, charges of the irradiated region (i.e., regions of the electrostatic latent image) are neutralized or connected to an electrode with a set potential, thus, the charge distribution on the surface of the developing drum 36 changes to form an electrostatic latent image. Due to the potential difference between the electrostatic latent image and the photocurable material 75, the photocurable material 75 is selectively attracted to the surface of the developing drum 36. For example, the feeder 2 applies negative (or positive) static electricity to the photocurable material 75, so that the photocurable material 75 with negative (or positive) charges on the feeder 2 jumps to exposed areas of the developing drum, in contrast, unexposed areas of the developing drum are still negatively (or positively) charged and thus repel the photocurable material 75 with negative (or positive) charges, so the photocurable material 75 is not attached to the unexposed areas of the developing drum, thereby forming, on the developing drum 36, a visible image formed by the photocurable material 75, i.e., a visible pattern formed by the material layers 79. It should be noted that the electrostatic latent image can be formed on regions of the developing drum 36 where charges are removed, or regions of the developing drum 36 where charges are not removed, and then the formed electrostatic latent image can attract the material layer 79 to form an image.

Step 3: Transferring Process (i.e., a Process of Directly or Indirectly Transferring the Material Layer 79 to the Platform 51 from the Developing Drum 36)

FIG. 2 shows that the material layer 79 is directly transferred to the platform 51 from the developing drum 36. While the developing drum 36 rotates along an arrow 92, the developing drum and the carrier move with respect to each other. For example, the developing drum 36 moves along an arrow 91, so that the developing drum 36 and the platform 51 do not slide with respect to each other, but purely roll with respect to each other. At the same time, the curing light beam 38 emitted by the curing light source 32 passes through the electroconductive layer 12 that is transparent and the photoconductive layer 11 that is transparent and goes toward the platform 51 to irradiate the material layer 79, and then the material layer 79 is transferred to the carrier, i.e., the platform 51, so that material layer 79 is cured and attached to the platform 51 or the cured model 71 thereon and is peeled off and separated from the developing drum 36. FIGS. 9-13 show that the material layer 79 can be indirectly transferred to the platform 51, specifically, the material layer 79 is transferred to the conveying mechanism from the developing drum 36, and then transferred to the carrier from the conveying mechanism. The conveying mechanism may be a conveying drum 41, a conveyor belt 42 or a combination thereof. The carrier may be a platform 51 or a paper 59 or other components on which cured layers can be attached.

Further, in some embodiments, a cleaning process may be performed to clean the surface of the developing drum 36. The cleaning device 14 removes the photocurable material remaining on the surface of the developing drum to ensure that the surface of the developing drum is clean in the next printing cycle, that is, the photocurable material remaining on the surface of the developing drum does not involve the next printing cycle to affect the printing of the next layer. The cleaning device may be a scraper, a brush, a cleaning roller, or a vacuum cleaner or a combination thereof.

The terms "upper", "lower", "left" and "right" and the like are used herein for the purpose of the description, but are not intended to limit the present application, In practice, some modifications can be made by those skilled in the art by the spatial transformation and actual orientation change of the structure. However, these modifications should fall within the scope of the present application.

What is claimed is:

1. A photocuring printing system, comprising a developing assembly, a carrier and a curing light source;
    wherein the developing assembly comprises a developing drum, a developing engine and a feeder; the developing drum is rotatable around its central axis and is light-transmissive; the developing drum and the carrier are oppositely arranged and movable with respect to each other; the developing drum has a developing surface on which an electrostatic latent image is formed by the developing engine; the feeder and the developing surface of the developing drum are oppositely arranged; and
    during a rotation of the developing drum around its central axis, a photocurable material provided by the feeder is selectively attracted by the electrostatic latent image to form a material layer on the developing surface; the material layer is applied, by the developing drum, on a forming surface of the carrier or a cured model on the carrier; and a curing light beam emitted by the curing light source passes through a material-laying side of the developing drum to irradiate the material layer between the developing drum and the carrier to form a cured layer.

2. A photocuring printing system, comprising a developing assembly, a carrier, a curing light source and a conveying mechanism configured to convey the material layer;
    wherein the conveying mechanism has a material layer attachment surface which is rotatable and light-transmissive; the conveying mechanism and the carrier are oppositely arranged and movable with respect to each other; the developing assembly comprises a developing drum, a developing engine and a feeder; the developing drum is rotatable around its central axis; the developing drum has a developing surface on which an electrostatic latent image is formed by the developing engine; the developing surface of the developing drum and the material layer attachment surface of the conveying mechanism are oppositely arranged; and
    during a rotation of the developing drum around its central axis, a photocurable material provided by the feeder is selectively attracted by the electrostatic latent image to form a material layer on the developing surface; the material layer between the developing surface of the developing drum and the material layer attachment surface of the conveying mechanism is attracted and attached to the material layer attachment surface of the conveying mechanism; the material layer is applied, by the conveying mechanism, on a forming surface of the carrier or a cured model on the carrier; and a curing light beam emitted by the curing light source passes through a material-laying side of the conveying mechanism to irradiate the material layer between the conveying mechanism and the carrier to form a cured layer.

3. The photocuring printing system of claim 1, wherein the developing drum comprises a photoconductive layer and an electroconductive layer bound together from outside to inside;
    the developing engine comprises a first electrostatic generator and a developing light source; the first electrostatic generator is arranged upstream from the feeder along a rotational direction of the developing drum; the first electrostatic generator produces static electricity on the photoconductive layer; the developing light source is arranged between the first electrostatic generator and the feeder along a rotational direction of the developing drum; and a developing light beam emitted by the developing light source selectively irradiates the photoconductive layer to form the electrostatic latent image on the developing surface.

4. The photocuring printing system of claim 1, wherein the developing surface of the developing drum is electrically insulating; the developing engine comprises an ion-deposition device which is arranged upstream from the feeder along a rotational direction of the developing drum; the ion-deposition device selectively deposits ions or electrons to the developing surface of the developing drum to form the electrostatic latent image.

5. The photocuring printing system of claim 1, wherein the feeder comprises a wheel hub that is rotatable, a material box and a second electrostatic generator; the photocurable material that is liquid is accommodated in the material box; the wheel hub is partially immersed in the photocurable material; a surface of the wheel hub and the developing surface of the developing drum are oppositely arranged; when the wheel hub rotates, the photocurable material attached on the surface of the wheel hub becomes layered; the second electrostatic generator is arranged between the material box and the developing drum along a rotational direction of the wheel hub; and the second electrostatic generator produces static electricity on the photocurable material that is layered on the surface of the wheel hub.

6. The photocuring printing system of claim 5, wherein a first electrode is provided at an inner side of the wheel hub and configured to attract the photocurable material that is layered.

7. The photocuring printing system of claim 1, wherein the forming surface of the carrier is flat; and the carrier and the developing drum perform linear translation with respect to each other.

8. The photocuring printing system of claim 1, wherein the forming surface of the carrier is an annular or circular plane; the carrier and the developing drum are horizontally rotatable with respect to each other and around a central axis of the carrier; or
    the forming surface of the carrier is cylindrical; a relative rotation between the carrier and the developing drum is formed by respective rotations of the developing drum and the carrier; the developing drum is continuously rotatable in a predetermined direction; the carrier and the developing drum are continuously movable away from each other such that cured layers are stacked layer by layer in a spiral manner to form the cured model on the carrier.

9. The photocuring printing system of claim 7, wherein the carrier is circularly movable along a rectangular track and the developing drum is rotatable in a predetermined direction such that cured layers are stacked layer by layer to form the cured model on the carrier.

10. The photocuring printing system of claim 2, wherein the forming surface of the carrier is flat; and the carrier and the conveying mechanism perform linear translation with respect to each other.

11. The photocuring printing system of claim 2, wherein the forming surface of the carrier is an annular or circular plane; and the carrier and the conveying mechanism are horizontally rotatable with respect to each other and around a central axis of the carrier; or the forming surface of the carrier is cylindrical; a relative rotation between the carrier and the conveying mechanism is formed by respective rotations of the conveying mechanism and the carrier; the material layer attachment surface of the conveying mechanism is continuously rotatable in a predetermined direction; and the carrier and the conveying mechanism are continuously movable away from each other such that cured layers are stacked layer by layer in a spiral manner to form the cured model on the carrier.

12. The photocuring printing system of claim 10, wherein the carrier is circularly movable along a rectangular track and the conveying mechanism is rotatable in a predetermined direction such that the cured layers are stacked layer by layer to form the cured model on the carrier.

13. The photocuring printing system of claim 2, wherein the conveying mechanism comprises a conveyor belt that is circularly rotatable and a roller-shaped electrode configured to attract the material layer; and the roller-shaped electrode is opposite to the developing drum and arranged on an inner side of the conveyor belt.

14. The photocuring printing system of claim 2, wherein the conveying mechanism comprises a conveying drum that is rotatable, a conveying belt that is circularly rotatable, and a second electrode and a roller-shaped electrode which are configured to attract the material layer; the conveying drum is arranged between the developing drum and the conveying belt; a material layer attachment surface of the conveying drum matches with the developing surface of the developing drum and a material layer attachment surface of the conveying belt, respectively; the second electrode is arranged on an inner side of the conveying drum; the roller-shaped electrode is opposite to the conveying drum and arranged on an inner side of the conveying belt; and the material layer is laid on the surface of the carrier or the cured model on the carrier through the conveyor belt.

15. The photocuring printing system of claim 2, wherein the photocuring printing system comprises a plurality of developing assemblies; developing drums of the plurality of developing assemblies each are opposite to the material layer attachment surface of the conveying mechanism.

16. The photocuring printing system of claim 1, wherein the photocuring printing system comprises a plurality of developing assemblies; developing drums of the plurality of developing assemblies simultaneously apply material layers on the same layer or different layers followed by photocuring.

17. The photocuring printing system of claim 2, wherein during printing, the developing drum is driven to rotate; the electrostatic latent image is selectively formed on the developing surface of the developing drum by the developing engine; and the electrostatic latent image selectively attracts the photocurable material provided by the feeder to form the material layer;

when the material layer attached on the developing drum rotates and arrives between the developing drum and the conveying mechanism, the material layer is transferred, by electric attraction, from the developing surface of the developing drum to the material layer attachment surface of the conveying mechanism;

the conveying mechanism and the carrier move respect to each other; the material layer is applied, by the conveying mechanism, on the forming surface of the carrier or the cured model on the carrier; and while the material layer is applied on the surface of the carrier, the curing light beam emitted by the curing light source passes through the material-laying side of the conveying mechanism to irradiate the material layer between the conveying mechanism and the carrier to form the cured layer bound to the carrier or the cured model on the carrier.

18. The photocuring printing system of claim 17, wherein the photocuring printing system comprises a plurality of developing assemblies which synchronously work; developing drums of the plurality of developing assemblies are respectively opposite to the material layer attachment surface of the conveying mechanism; the plurality of developing drums respectively and selectively attract photocurable materials that differ in material or color to form material layers prepared from different materials or having different colors; the formed material layers are then transferred to the material layer attachment surface of the conveying mechanism to form a combination layer of the material layers; and the combination layer is applied, by the conveying mechanism, to the forming surface of the carrier or the cured model on the carrier, and the curing light beam emitted by the curing light source passes through the material-laying side of the conveying mechanism to irradiate the combination layer between the conveying mechanism and the carrier to form the cured layer.

\* \* \* \* \*